(12) United States Patent
Abe et al.

(10) Patent No.: US 8,421,818 B2
(45) Date of Patent: *Apr. 16, 2013

(54) SIGNAL PROCESSING DEVICE AND PROJECTION-TYPE IMAGE DISPLAY DEVICE

(75) Inventors: Takaaki Abe, Osaka (JP); Masutaka Inoue, Hirakata (JP)

(73) Assignee: Sanyo Electric Co., Ltd, Moriguchi-Shi (JP)

( * ) Notice: Subject to any disclaimer, the term of this patent is extended or adjusted under 35 U.S.C. 154(b) by 272 days.

This patent is subject to a terminal disclaimer.

(21) Appl. No.: 12/847,726

(22) Filed: Jul. 30, 2010

(65) Prior Publication Data
US 2011/0013041 A1 Jan. 20, 2011

Related U.S. Application Data

(63) Continuation-in-part of application No. PCT/JP2009/051555, filed on Jan. 30, 2009.

(30) Foreign Application Priority Data

Jan. 30, 2008 (JP) ................................. 2008-019610
Dec. 26, 2008 (JP) ................................. 2008-335003

(51) Int. Cl.
*G09G 5/00* (2006.01)
*G09G 5/02* (2006.01)
*H04N 5/57* (2006.01)
*H04N 9/68* (2006.01)
*H04N 1/40* (2006.01)
*G03F 3/08* (2006.01)
*G06K 9/00* (2006.01)
*G06K 9/40* (2006.01)
*G06K 9/54* (2006.01)

(52) U.S. Cl.
USPC ........... 345/600; 345/428; 345/581; 345/606; 345/619; 348/603; 348/645; 348/673; 348/687; 348/703; 358/518; 358/520; 358/461; 382/162; 382/167; 382/254; 382/274

(58) Field of Classification Search .................. 345/600, 345/604
See application file for complete search history.

(56) References Cited

U.S. PATENT DOCUMENTS

2006/0262224 A1* 11/2006 Ha et al. ........................ 348/582
2009/0290068 A1* 11/2009 Abe et al. ...................... 348/649
2011/0084981 A1* 4/2011 Abe et al. ...................... 345/590

FOREIGN PATENT DOCUMENTS

| JP | 2002-324350 | 11/2000 |
| JP | 2007-324665 | 12/2007 |
| WO | WO2006/129611 | 12/2006 |

*Primary Examiner* — Ulka Chauhan
*Assistant Examiner* — Schiller Hill
(74) *Attorney, Agent, or Firm* — Marvin A. Motsenbocker; Mots Law, PLLC

(57) ABSTRACT

A signal processing device (200) included in a display which has a color reproduction range larger than that of the input device. The signal processing device (200) comprises color coordinate adjusting unit (210) for performing a color coordinate adjustment for reducing the color coordinates of a video input signal inputted from the input device so as to reduce the variation of the color coordinates caused by the difference between the color reproduction ranges, a luminance adjusting unit (220) for performing a luminance adjustment for reducing the luminance component of the video input signal, a display element control unit (240) for generating a video output signal according to the output of the color coordinate adjusting unit (210) and the output of the luminance adjusting unit (220), and a rate control unit (230) for increasing the color coordinate adjustment contribution rate ($\beta$) given to the video output signal by the color coordinate adjustment and decreasing the luminance component contribution rate ($\alpha$) given to the video output signal by the luminance adjustment if the color saturation of the video input signal with a specific hue is higher than a predetermined threshold.

10 Claims, 22 Drawing Sheets

|   | m−1 | m | m+1 |
|---|---|---|---|
| n−1 | −1 | −1 | −1 |
| n | −1 | 8 | −1 |
| n+1 | −1 | −1 | −1 |

|     | m−1 | m  | m+1 |
|-----|-----|----|-----|
| n−1 | −1  | −1 | −1  |
| n   | −1  | 8  | −1  |
| n+1 | −1  | −1 | −1  |

SIGNAL PROCESSING DEVICE AND PROJECTION-TYPE IMAGE DISPLAY DEVICE

CROSS-REFERENCES TO RELATED APPLICATIONS

This application is a continuing application according to 37 C.F.R. 1.53(b) and (j) of the international application number PCT/JP2009/051555 filed on Jan. 30, 2009, which in turn claims the benefit of Japanese patent application number 2008-019610, filed on Jan. 30, 2008 and Japanese application number 2008-335003 filed on Dec. 26, 2008, the disclosures of which applications are incorporated by reference herein.

TECHNICAL FIELD

The present invention relates to a signal processing device which converts an image input signal into an image output signal, and also relates to a projection-type image display device.

BACKGROUND ART

Conventionally, there has been known a display device configured to display an image picked up by an image pickup device such as a camera. As a light source configured to irradiate the display device with light, a solid light source (for example, LD: Laser Diode, or LED: Light Emitting Diode) with a wide color reproduction range has been developed. A case is assumed where the color reproduction range of such a display device differs from a color reproduction range of the image pickup device.

Meanwhile, a technique of reducing a color reproduction range of an inputting device (for example, an image pickup device) has been proposed to handle a case where the color reproduction range of the inputting device is wider than a color reproduction range of an outputting device (for example, a display device) (for example, Japanese Patent Application Publication No. 2000-324350). Specifically, the direction of reducing the color reproduction range is changed for each hue to thereby output a visually natural image.

Here, suppose a case where the color reproduction range of the outputting device (for example, the display device) is wider than the color reproduction range of the inputting device (for example, the image pickup device). In such a case, when the outputting device displays an image according to an image input signal inputted from the inputting device, the displayed image has color coordinates in a wider range than that of color coordinates of an actual object. Here, the color coordinates are coordinates defined by a saturation and a hue.

Meanwhile, application of the aforementioned technique is conceivable to make the color coordinates of the image close to the color coordinates of the actual one. However, simply reducing the color reproduction range of the outputting device results in ineffective utilization of the color reproduction range of the outputting device (display device).

DISCLOSURE OF THE INVENTION

A signal processing device according to a first aspect configured to convert an image input signal into an image output signal and to output the image output signal to a display device. The signal processing device includes: a color-coordinate adjustment unit (color-coordinate adjustment unit 210) configured to perform color-coordinate adjustment processing of adjusting color coordinates of the image input signal, according to a color reproduction range of the display device; a lightness adjustment unit (lightness adjustment unit 220) configured to perform lightness adjustment processing of adjusting a lightness component of the image input signal; an output signal generator (display element controller 240) configured to generate the image output signal based on the color coordinates adjusted by the color-coordinate adjustment processing and the lightness component adjusted by the lightness adjustment processing; and a controller (ratio controller 230) configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing. When the saturation of the image input signal is higher than a predetermined threshold in a specific hue, the controller increases the color-coordinate adjustment contribution rate while decreasing the lightness component contribution rate.

In the first aspect, as to the specific hue, in the case where the saturation of an image input signal is higher than the predetermined threshold, that is, in the case where there is a large difference between the color coordinates of the image and the color coordinates of the actual one, the controller increases the color-coordinate adjustment contribution rate while decreasing the lightness component contribution rate.

Accordingly, in the case where there is a large difference between the color coordinates of the image and the color coordinates of the actual one, the difference between the color coordinates of the image and the color coordinates of the actual one can be reduced.

In contrast, as to the specific hue (for example, red hue), in the case where the saturation of an image input signal is lower than the predetermined threshold, that is, in a case where there is a small difference between the color coordinates of the image and the color coordinates of the actual one, the controller decreases the color-coordinate adjustment contribution rate while increasing the lightness component contribution rate.

Accordingly, in the case where there is a small difference between the color coordinates of the image and the color coordinates of the actual one, the color reproduction range of the liquid crystal panel 30 can be effectively utilized.

The signal processing device according to the first aspect, further includes an acquisition unit (acquisition unit 250) configured to acquire a luminance of an image based on the image input signal. As the luminance acquired by the acquisition unit becomes higher, the controller increases the color-coordinate adjustment contribution rate while decreasing the lightness component contribution rate.

The signal processing device according to the first aspect, further includes an acquisition unit (acquisition unit 250) configured to acquire a hue of each of pixels forming an image, based on the image input signal. As the hue acquired by the acquisition unit becomes closer to the specific hue, the controller increases the color-coordinate adjustment contribution rate while decreasing the lightness component contribution rate.

The signal processing device according to the first aspect, further includes an acquisition unit configured to acquire a saturation of each of pixels forming an image, based on the image input signal. As the saturation acquired by the acquisition unit becomes higher, the controller increases the color-coordinate adjustment contribution rate while decreasing the lightness component contribution rate.

In the first aspect, the controller controls the color-coordinate adjustment contribution rate and the lightness component contribution rate, based on a distribution of values of pixels having the specific hue.

In the first aspect, the controller controls the color-coordinate adjustment contribution rate and the lightness component contribution rate, based on a frequency component of a pixel having the specific hue.

In the first aspect, the controller controls the color-coordinate adjustment contribution rate and the lightness component contribution rate, for each of pixels.

A projection-type image display device according to a second aspect includes: the signal processing device according to the first aspect; a display device configured to display an image based on a video output image outputted from the signal processing device; and a projector configured to project the image displayed by the display device.

BEST MODES FOR CARRYING OUT THE INVENTION

Figure 1:
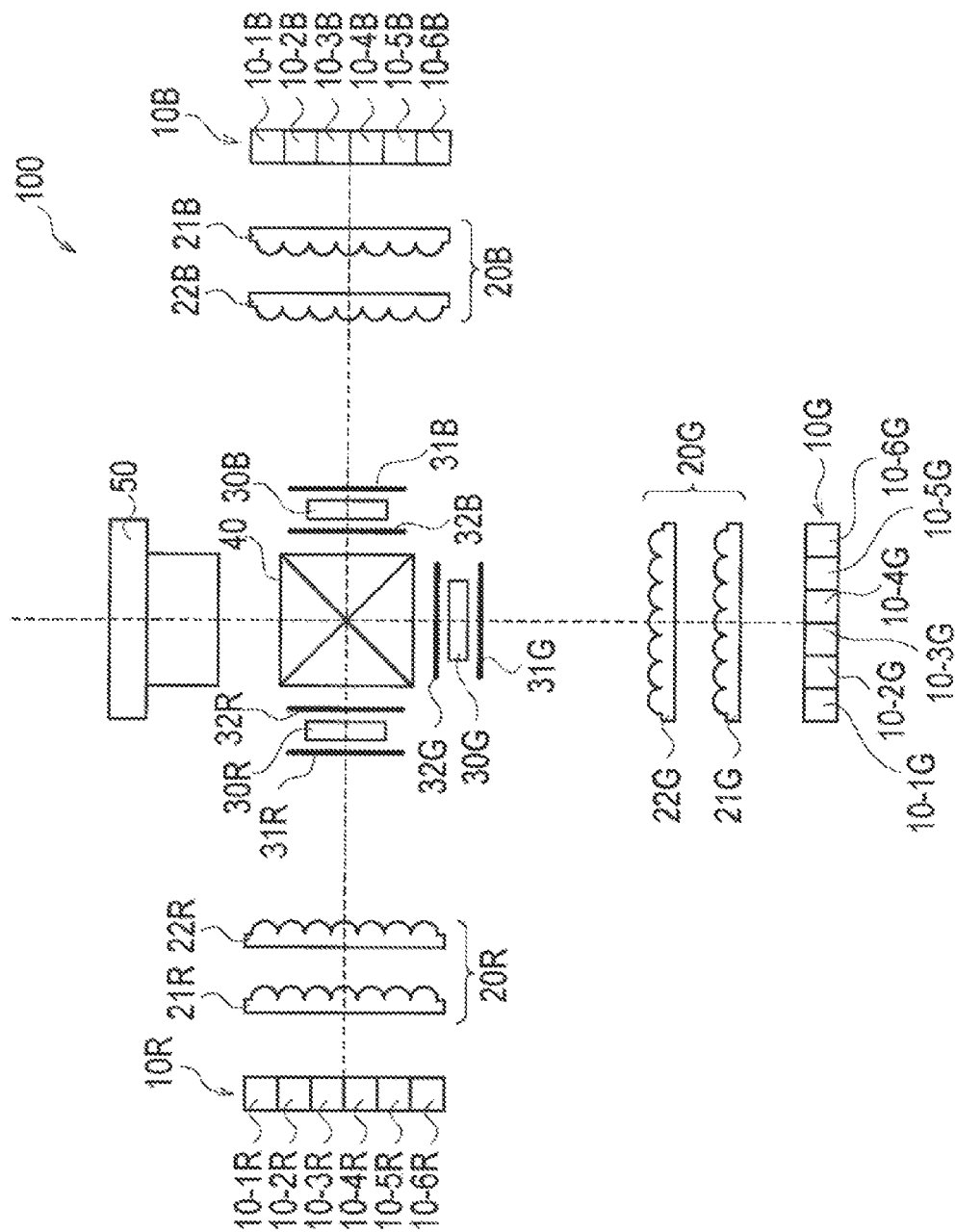
FIG. 1 is a diagram showing a configuration of a projection-type image display device according to First Embodiment.

Hereinbelow, a projection-type image display device according to embodiments of the present invention is described with reference to the drawings. Note that, in the following description of the drawings, the same or similar reference numerals denote the same or similar portions.

In addition, it should be noted that the drawings are schematic and ratios of dimensions and the like are different from actual ones. Therefore, specific dimensions and the like should be determined in consideration of the following description. Moreover, it is a matter of course that the drawings also include portions having different dimensional relationships and ratios from each other.

[Summary of Embodiments]

A signal processing device according to the embodiments is configured to convert an image input signal into an image output signal and to then output the image output signal to a display device. The signal processing device includes: a color-coordinate adjustment unit configured to perform color-coordinate adjustment processing of adjusting color coordinates of the image input signal, according to a color reproduction range of the display device; a lightness adjustment unit configured to perform lightness adjustment processing of adjusting a lightness component of the image input signal; an output signal generator configured to generate the image output signal based on the color coordinates adjusted by the color-coordinate adjustment processing and the lightness component adjusted by the lightness adjustment processing; and a controller configured to control a color-coordinate contribution rate and a lightness component contribution rate based on a saturation of the image input signal, the color-coordinate contribution rate being given to the image output signal by the color-coordinate adjustment processing, the lightness component contribution rate being given to the image output signal by the lightness adjustment processing. When the saturation of the image input signal is higher than a predetermined threshold in a specific hue, the controller increases the color-coordinate adjustment contribution rate while decreasing the lightness component contribution rate.

Note that "lightness" according to the embodiments is a term representing brightness. Thus, the "lightness" should be understood as a term representing a wide-range concept including luminance.

In addition, lightness adjustment processing is processing of adjusting a "lightness component" of an image input signal. The "lightness component" is a term representing a component of brightness, like the "lightness." Thus, the "lightness component" should be understood as a term representing a wide-range concept including a lightness component. Furthermore, the "lightness component" may have a maximum value carried by image input signals (a red input signal $R_{in}$, a green input signal $G_{in}$, and a blue input signal $B_{in}$).

[First Embodiment]

(Configuration of Projection-Type Image Display Device)

Hereinbelow, a configuration of a projection-type image display device according to First Embodiment is described with reference to the drawings. FIG. 1 is a diagram showing a configuration of a projection-type image display device 100 according to First Embodiment.

As shown in FIG. 1, the projection-type image display device includes: multiple light source units 10; multiple fly-eye lens units 20; multiple liquid crystal panels 30; a cross dichroic prism 40; and a projection lens unit 50.

The multiple light source units 10 are a light source unit 10R, a light source unit 10G, and a light source unit 10B. Each light source unit 10 is a unit constituted of multiple solid light sources. The solid light sources are, for example, LDs (Laser Diodes) and LEDs (Light Emitting Diodes). The light source unit 10R is constituted of multiple solid light sources (10-1R to 10-6R) which emit red component light. The light source unit 10G is constituted of multiple solid light sources (10-1G to 10-6G) which emit green component light. The light source unit 10B is constituted of multiple solid light sources (10-1B to 10-6B) which emit blue component light.

The multiple fly-eye lens units 20 are a fly-eye lens unit 20R, a fly-eye lens unit 20G, and a fly-eye lens unit 20B. Each fly-eye lens unit 20 is constituted of a fly-eye lens 21 and a fly-eye lens 22. Each of the fly-eye lens 21 and the fly-eye lens 22 is constituted of multiple microlenses. Each microlens collects light emitted from a corresponding one of the light source units 10, so that an entire surface of a corresponding one of the liquid crystal panels 30 is irradiated with the light emitted from the light source unit 10.

The multiple liquid crystal panels 30 are a liquid crystal panel 30R, a liquid crystal panel 30G, and a liquid crystal panel 30B. The liquid crystal panel 30R modulates red component light by rotating a polarizing direction of the red component light. An incidence-side polarizing plate 31R is provided on the light-incidence-surface side of the liquid crystal panel 30R. The incidence-side polarizing plate 31R transmits light polarizing in one polarizing direction (for example, P polarization) and blocks light polarizing in the other polarizing direction (for example, S polarization). An emission-side polarizing plate 32R is provided on the light-emission-surface side of the liquid crystal panel 30R. The emission-side polarizing plate 32R blocks light polarizing in the one polarizing direction (for example, P polarization) and transmits light polarizing in the other polarizing direction (for example, S polarization).

Similarly, the liquid crystal panel 30G and the liquid crystal panel 30B modulate green component light and blue component light, respectively, by rotating the polarizing directions of the green component light and the blue component light. An incidence-side polarizing plate 31G is provided on the light-incidence-surface side of the liquid crystal panel 30G, while an emission-side polarizing plate 32G is provided on the light-emission-surface side of the liquid crystal panel 30G. An incidence-side polarizing plate 31B is provided on the light-incidence-surface side of the liquid crystal panel 30B, while an emission-side polarizing plate 32B is provided on the light-emission-surface side of the liquid crystal panel 30B.

The cross dichroic prism 40 synthesizes the light emitted from the liquid crystal panel 30R, the liquid crystal panel 30G, and the liquid crystal panel 30B. The cross dichroic prism 40 emits the synthesized light to the projection lens unit 50 side.

The projection lens unit 50 projects the synthesized light (image light) emitted from the cross dichroic prism 40, on a screen or the like.

(Hue and Saturation)

Figure 2:
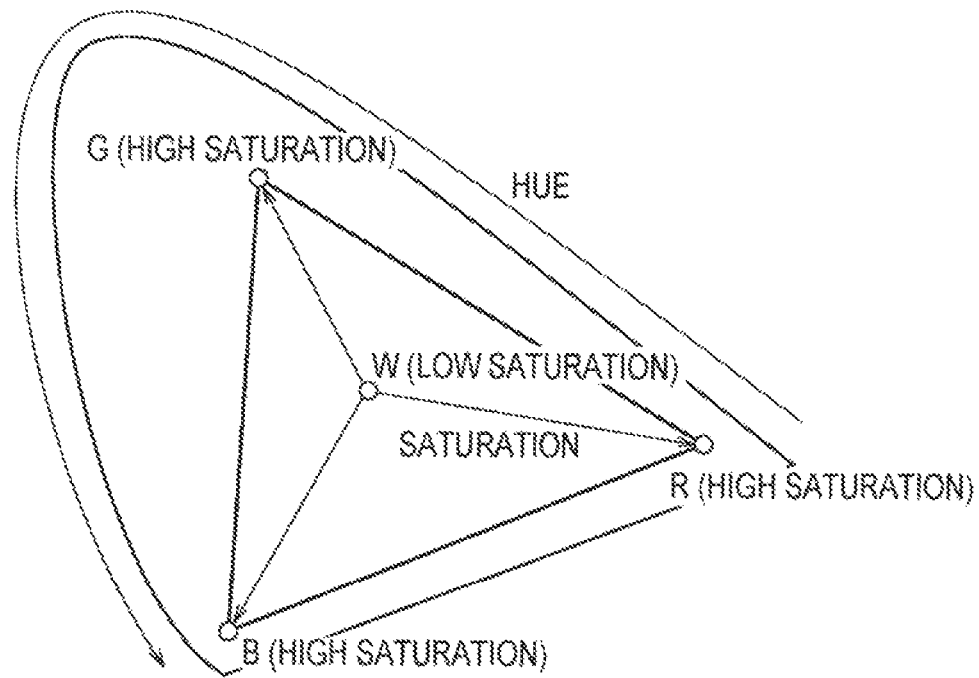
FIG. 2 is a diagram showing a general color reproduction range representing a hue and a saturation.

Hereinbelow, a hue and a saturation according to First Embodiment are described with reference to the drawings. FIG. 2 is a chromaticity diagram showing a general color reproduction range representing a hue and a saturation. In FIG. 2, a point W is a point showing white, while a point R, a point G, and a point B are points which show red, green, and blue, respectively.

As shown in FIG. 2, a hue is represented by an angle made by the point W and an outer circumference of the color reproduction range. A saturation takes on the lowest value at the point W. The value thereof becomes higher, as a distance from the point W increases.

Meanwhile, the projection-type image display device 100 according to First Embodiment receives image input signals from an inputting device (for example, an image pickup device).

The color reproduction range of each of the liquid crystal panels 30 depends on light emitted from the corresponding light source unit 10. That is, the higher a color purity of light emitted from the light source unit 10, the wider the color reproduction range of the liquid crystal panel 30. In contrast, the color reproduction range of the inputting device depends on the accuracy of an image sensor provided to the inputting device or the like.

Figure 3:
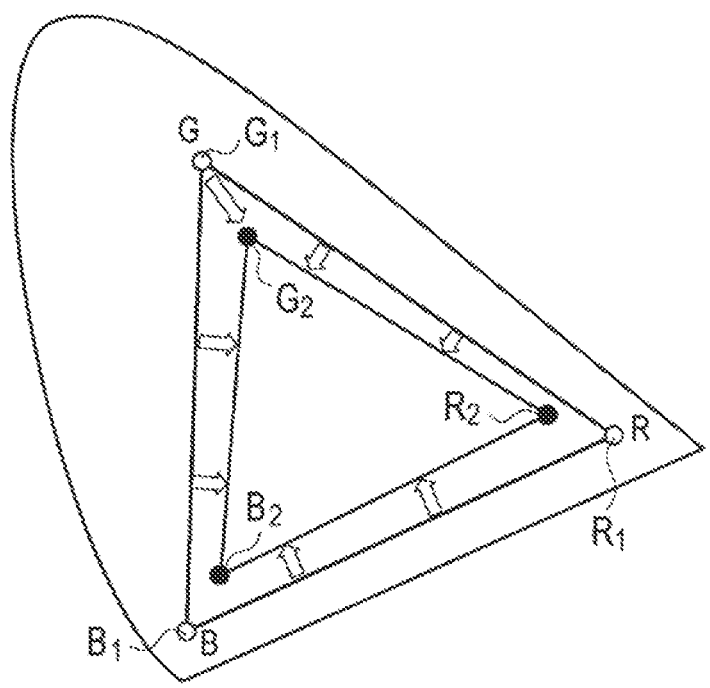
FIG. 3 is a diagram showing a color reproduction range of a liquid crystal panel 30 according to First Embodiment.

In First Embodiment, as shown in FIG. 3, suppose a case where the color reproduction range ($R_1$, $G_1$, $B_1$) of the liquid crystal panel 30 is wider than the color reproduction range ($R_2$, $G_2$, $B_2$) of the inputting device.

(Functions of Projection-Type Image Display Device)

Figure 4:
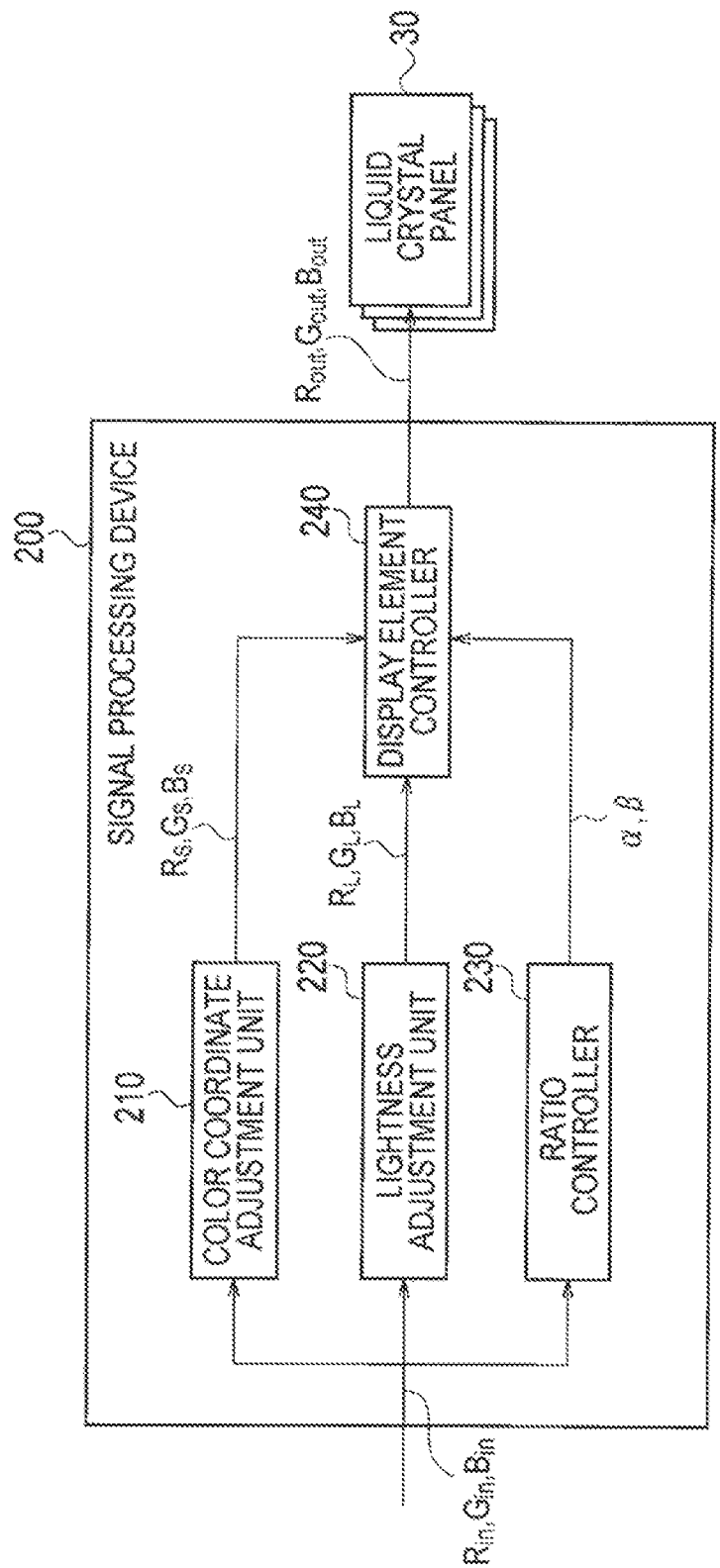
FIG. 4 is a block diagram showing a configuration of a signal processing device 200 according to First Embodiment.

Hereinbelow, functions of the projection-type image display device according to First Embodiment are described with reference to the drawings. FIG. 4 is a block diagram showing functions of the projection-type image display device 100 (a signal processing device 200) according to First Embodiment.

The signal processing device 200 acquires image input signals including a red input signal $R_{in}$, a green input signal $G_{in}$, and a blue input signal $B_{in}$. The signal processing device 200 outputs image output signals including a red output signal $R_{out}$, a green output signal $G_{out}$, and a blue output signal $B_{out}$. Note that each of the red input signal $R_{in}$, the green input signal $G_{in}$, and the blue input signal $B_{in}$ takes on values in a range between the minimum pixel value (for example, "0") and the maximum pixel value (for example, "255"). Likewise, each of the red output signal $R_{out}$, the green output signal $G_{out}$, and the blue output signal $B_{out}$ takes on values in a range between the minimum pixel value (for example, "0") and the maximum pixel value (for example, "255").

As shown in FIG. 4, the signal processing device 200 includes a color-coordinate adjustment unit 210, a lightness adjustment unit 220, a ratio controller 230, and a display element controller 240.

The color-coordinate adjustment unit 210 performs color-coordinate adjustment processing for adjusting color coordinates of each image input signal based on a difference between the color reproduction range of the liquid crystal panel 30 and the color reproduction range of the inputting device. Note that, in such a chromaticity diagram shown in FIG. 2, the color coordinates indicate a position in a closed curve made by a spectrum locus and a purple boundary, and are coordinates represented by the saturation and the hue. Here, it is presupposed that the color reproduction range of the inputting device is known. Thus, the color-coordinate adjustment unit 210 performs the color-coordinate adjustment processing according to the color reproduction range of the liquid crystal panel 30. The color-coordinate adjustment processing is processing of reducing the color coordinates of the image input signal for suppressing variation of the color coordinates occurring due to the difference of the color reproduction ranges. Specifically, the color-coordinate adjustment processing is processing of changing the aforementioned position in the closed curve by adjusting the saturation and the hue.

For example, the color-coordinate adjustment unit 210 performs the color-coordinate adjustment processing in accordance with the following equation (1). Here, $R_S$, $G_S$, and $B_S$ are color-coordinate adjustment signals corresponding to red, green, and blue, respectively.

[Formula 1]
$$\begin{pmatrix} R_S \\ G_S \\ B_S \end{pmatrix} = \begin{pmatrix} a & b & c \\ d & e & f \\ g & h & i \end{pmatrix} \times \begin{pmatrix} R_{in} \\ G_{in} \\ B_{in} \end{pmatrix} \quad \text{Equation (1)}$$

Note that parameters a to i are constants determined according to the color reproduction range of the liquid crystal panel 30.

The lightness adjustment unit 220 performs lightness adjustment processing of adjusting a lightness component of the image input signal. The lightness adjustment processing is processing of reducing the lightness component of the image input signal for suppressing glare of a color having a high saturation (purity).

For example, the lightness adjustment unit 220 performs the lightness adjustment processing in accordance with the following equation (2). Here, $R_L$, $G_L$, and $B_L$ are lightness adjustment signals corresponding to red, green, and blue, respectively.

[Formula 2]
$$\begin{pmatrix} R_L \\ G_L \\ B_L \end{pmatrix} = Lum \times \begin{pmatrix} R_{in} \\ G_{in} \\ B_{in} \end{pmatrix} \quad \text{Equation (2)}$$

Note that a parameter Lum is a constant for determining a reduction ratio of the lightness component of the image input signal. Note that the parameter Lum takes on values in a range between the minimum value and 1. The minimum value is a value in a range between 0 and 1.

The ratio controller 230 controls the color-coordinate adjustment contribution rate and the lightness component contribution rate. The color-coordinate adjustment contribution rate is a contribution rate given to each image output signal by the color-coordinate adjustment processing (color-coordinate adjustment signal). The lightness adjustment contribution rate is a contribution rate given to the image output signal by the lightness adjustment processing (lightness adjustment signal).

Specifically, the ratio controller 230 controls a color-coordinate adjustment contribution rate ($\beta$) and a lightness component contribution rate ($\alpha$) based on the hue and the saturation of the image input signal. Note that $\alpha$ is a value in a range between 0 and 1, and $\beta$ is a value in a range between 0 and 1.

The color-coordinate adjustment contribution rate ($\beta$) and the lightness component contribution rate ($\alpha$) have a trade-off relationship. That is, when the lightness component contribution rate ($\alpha$) is increased, the color-coordinate adjustment contribution rate ($\beta$) is decreased. Likewise, when the lightness component contribution rate ($\alpha$) is decreased, the color-coordinate adjustment contribution rate ($\beta$) is increased. The color-coordinate adjustment contribution rate ($\beta$) and the lightness component contribution rate ($\alpha$) satisfy a relation of $\alpha+\beta=1$, for example. Hereinbelow, the description is continued on the assumption that the relation of $\alpha+\beta=1$ is satisfied.

Specifically, the ratio controller 230 acquires the hue and the saturation of the image input signal for each pixel. The ratio controller 230 counts a pixel whose saturation exceeds a predetermined threshold in a specific hue (here, red hue) by using a determination counter.

Figure 5:
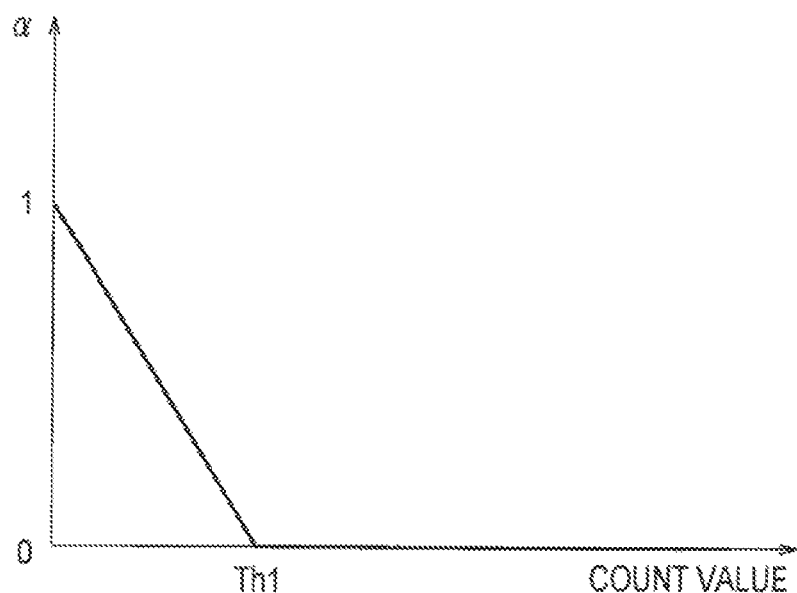
FIG. 5 is a graph showing a parameter a according to First Embodiment.

As shown in FIG. 5, the ratio controller 230 decreases the value of the lightness component contribution rate ($\alpha$), until a count value of the determination counter reaches a threshold Th1. In contrast, the ratio controller 230 maintains the value of the lightness component contribution rate ($\alpha$) at the minimum value (=0), when the count value of the determination counter exceeds the threshold Th1.

In other words, the ratio controller 230 increases the value of the color-coordinate adjustment contribution rate ($\beta$), until the count value of the determination counter reaches the threshold Th1. In contrast, the ratio controller 230 maintains the value of the lightness component contribution rate ($\alpha$) at the maximum value (=1), when the count value of the determination counter exceeds the threshold Th1.

As described above, in a case where the saturation of the image input signal is high in the specific hue (for example, red hue), that is, a case where there is a large difference between the color coordinates of the image and the color coordinates of the actual one, the ratio controller 230 increases the color-coordinate adjustment contribution rate ($\beta$), while decreasing the lightness component contribution rate ($\alpha$).

The display element controller 240 acquires the image output signal based on the color coordinates (color-coordinate adjustment signal) adjusted by the color-coordinate adjustment unit 210 and the lightness component (lightness adjustment signal) adjusted by the lightness adjustment unit 220. The display element controller 240 controls a ratio of the color-coordinate adjustment signal and the lightness adjustment signal based on the lightness component contribution rate ($\alpha$) and the color-coordinate adjustment contribution rate ($\beta$).

For example, the display element controller 240 acquires the image output signal in accordance with the following equation (3).

[Formula 3]

$$\begin{pmatrix} R_{out} \\ G_{out} \\ B_{out} \end{pmatrix} = \beta \times \begin{pmatrix} R_S \\ G_S \\ B_S \end{pmatrix} + \alpha \times \begin{pmatrix} R_L \\ G_L \\ B_L \end{pmatrix} \quad \text{Equation (3)}$$

(Operation of Projection-Type Image Display Device)

Figure 6:
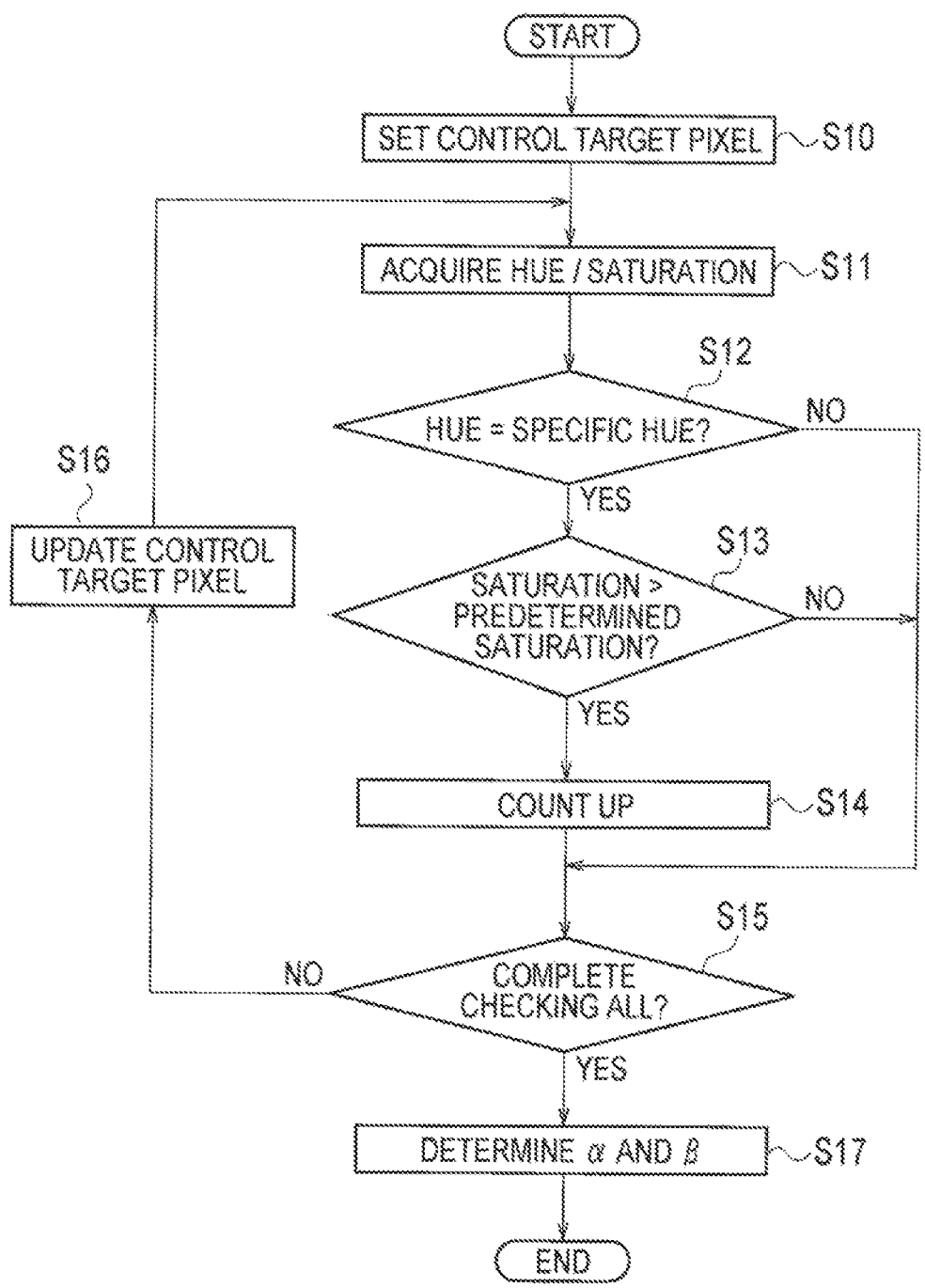
FIG. 6 is a flowchart showing an operation of the signal processing device 200 according to First Embodiment.

Hereinbelow, an operation of the projection-type image display device according to First Embodiment is described with reference to the drawing. FIG. 6 is a flowchart showing a function of the projection-type image display device 100 (signal processing device 200) according to First Embodiment.

As shown in FIG. 6, in step 10, the signal processing device 200 sets a certain pixel as a control target pixel, among multiple pixels forming an image (frame).

In step 11, the signal processing device 200 acquires the hue and the saturation of the control target pixel based on the image input signal of the control target pixel.

In step 12, the signal processing device 200 determines whether or not the hue acquired in step 11 is the specific hue (here, red hue). When the hue is the specific hue, the signal processing device 200 moves to processing to be performed in step 13. On the other hand, when the hue is not the specific hue, the signal processing device 200 moves to processing to be performed in step 15.

In step 13, the signal processing device 200 determines whether or not the saturation acquired in step 11 exceeds a predetermined threshold. When the saturation exceeds the predetermined threshold, the signal processing device 200 moves to processing to be performed in step 14. On the other hand, when the saturation does not exceed the predetermined threshold, the signal processing device 200 moves to processing to be performed in step 15.

In step 14, the signal processing device 200 performs count-up on the determination counter. Specifically, the signal processing device 200 adds "1" to the count value of the determination counter.

In step 15, the signal processing device 200 determines whether or not all the pixels forming the image (frame) are checked. When all the pixels are checked, the signal processing device 200 moves to processing to be performed in step 17. On the other hand, when all the pixels are not checked, the signal processing device 200 moves to processing to be performed in step 16.

In step 16, the signal processing device 200 updates the control target pixel. For example, the signal processing device 200 shifts the control target to a next pixel in a horizontal direction or a vertical direction.

In step 17, the signal processing device 200 determines the lightness component contribution rate ($\alpha$) and the color-coordinate adjustment contribution rate ($\beta$). Specifically, as shown in FIG. 5, the signal processing device 200 determines the lightness component contribution rate ($\alpha$) according to the count value of the determination counter.

(Advantages and Effects)

In First Embodiment, as to the specific hue (for example, red hue), in the case where the saturation of an image input signal is higher than the predetermined threshold, that is, in the case where there is a large difference between the color coordinates of the image and the color coordinates of the actual one, the ratio controller 230 increases the color-coordinate adjustment contribution rate while decreasing the lightness component contribution rate.

Accordingly, in the case where there is a large difference between the color coordinates of the image and the color coordinates of the actual one, the difference between the color coordinates of the image and the color coordinates of the actual one can be reduced.

In contrast, as to the specific hue (for example, red hue), in the case where the saturation of an image input signal is lower than the predetermined threshold, that is, in a case where there is a small difference between the color coordinates of the image and the color coordinates of the actual one, the ratio controller 230 decreases the color-coordinate adjustment contribution rate while increasing the lightness component contribution rate.

Accordingly, in the case where there is a small difference between the color coordinates of the image and the color coordinates of the actual one, the color reproduction range of the liquid crystal panel 30 can be effectively utilized.

[Second Embodiment]

Hereinbelow, Second Embodiment is described with reference to the drawing. Hereinbelow, a description is given mainly of a difference between First Embodiment described above and Second Embodiment.

Specifically, in First Embodiment described above, the parameter Lum used at the lightness adjustment processing is a constant. In contrast, in Second Embodiment, a parameter Lum used at lightness adjustment processing is determined based on an average luminance of multiple pixels forming an image (frame).

(Parameter Lum)

Figure 7:
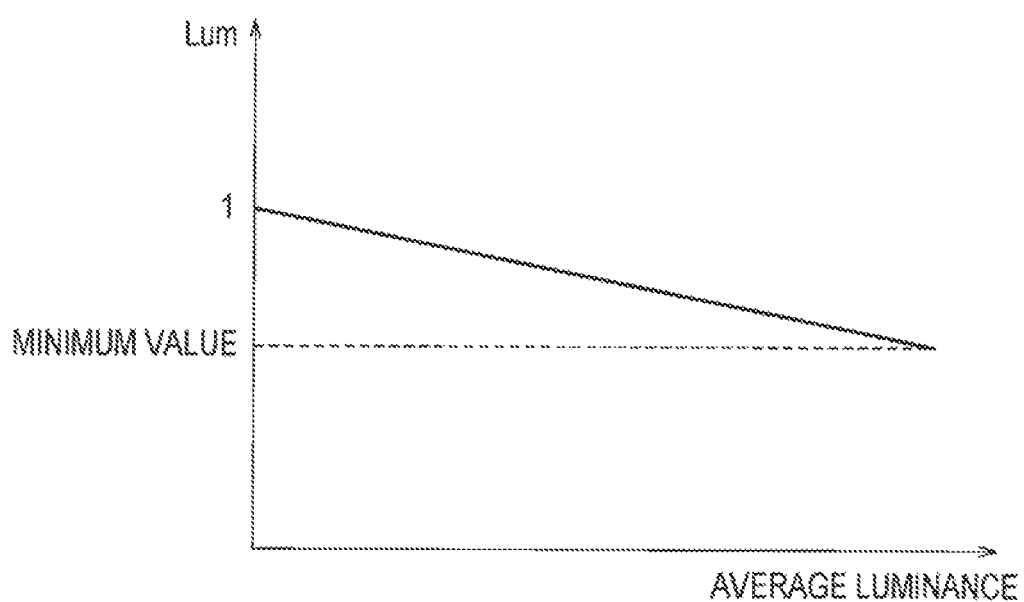
FIG. 7 is a graph showing a parameter Lum according to Second Embodiment.

Hereinbelow, a parameter Lum according to Second Embodiment is described with reference to the drawing. FIG. 7 is a graph showing the parameter Lum according to Second Embodiment.

As shown in FIG. 7, the lightness adjustment unit 220 described above determines the parameter Lum based on the average luminance of the multiple pixels forming an image (frame). Specifically, the lightness adjustment unit 220 determines a smaller value for the parameter Lum, as the average luminance becomes higher.

Note that the parameter Lum takes on values in a range between the minimum value and 1, as in First Embodiment. The minimum value is a value in a range between 0 and 1.

(Advantages and Effects)

In Second Embodiment, the lightness adjustment unit 220 determines a smaller value for the parameter Lum, as the average luminance becomes higher. Specifically, for a high-luminance image where a glare is likely to occur, the reduction ratio of a luminance component of the image input signal is increased. In contrast, for a low-luminance image where a glare is less likely to occur, the reduction ratio of the luminance component of the image input signal is decreased. Accordingly, it is possible to suppress the glare while improving the luminance to some extent.

[Third Embodiment]

Hereinbelow, Third Embodiment is described with reference to the drawings. Hereinbelow, a description is given mainly of a difference between First Embodiment described above and Third Embodiment.

Specifically, in First Embodiment described above, the lightness component contribution rate ($\alpha$) is determined based on the number of pixels whose saturations exceed the predetermined threshold in the specific hue (here, red hue). In contrast, in Third Embodiment, the lightness component contribution rate ($\alpha$) is determined based on a luminance gain ($GAIN_L$), a hue gain ($GAIN_{H(m,n)}$) and a saturation gain ($GAIN_{S(m,n)}$).

(Functions of Projection-Type Image Display Device)

Figure 8:
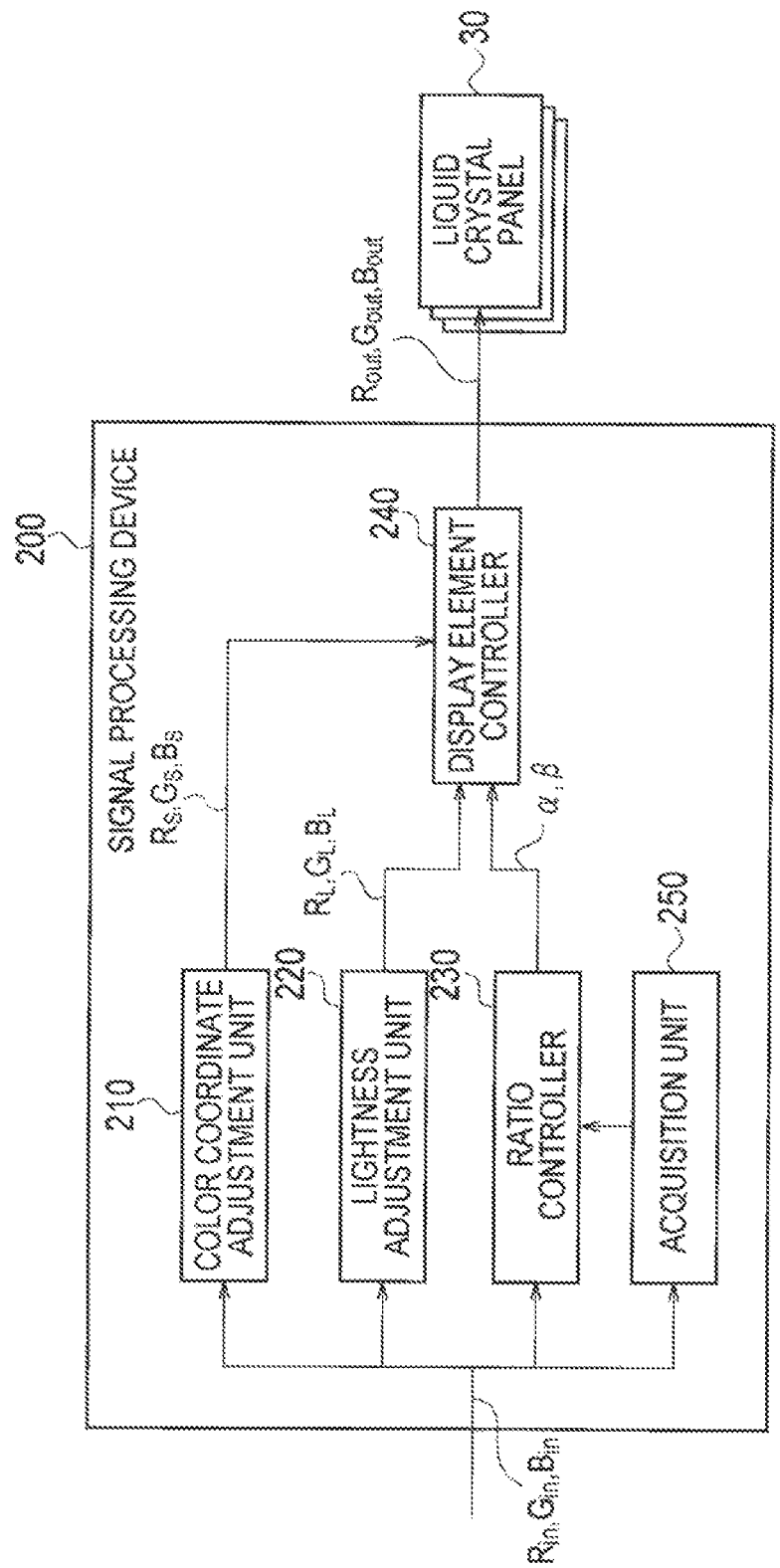
FIG. 8 is a block diagram showing a signal processing device 200 according to Third Embodiment.

Hereinbelow, functions of the projection-type image display device according to Third Embodiment are described with reference to the drawings. FIG. 8 is a block diagram showing functions of a projection-type image display device 100 (signal processing device 200) according to Third Embodiment. In FIG. 8, the same reference numerals denote portions in the same configuration as in FIG. 4.

As shown in FIG. 8, the signal processing device 200 includes an acquisition unit 250 in addition to the configuration shown in FIG. 4.

The acquisition unit 250 acquires various information based on an image input signal. Specifically, the acquisition unit 250 acquires (1) an average luminance of multiple pixels forming an image (frame), (2) a hue of each pixel (m, n) forming the image (frame), and (3) a saturation of the pixel (m, n) forming the image (frame).

Figure 9:
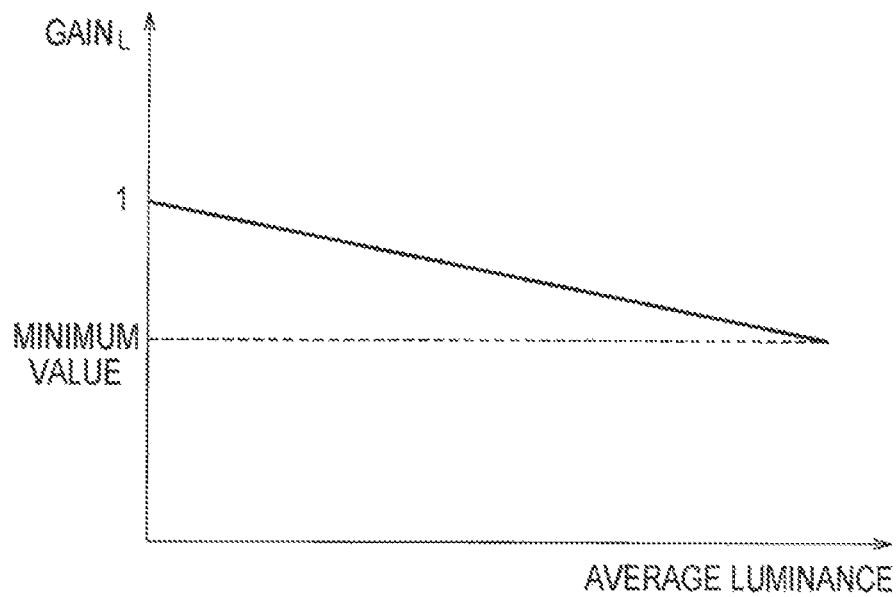
FIG. 9 is a graph showing a luminance gain according to Third Embodiment.

Here, the ratio controller 230 described above acquires a lightness component contribution rate $(\alpha)_{(m, n)}$ to be used for the pixel (m, n) based on the average luminance, the hue, and the saturation. Note that the ratio controller 230 acquires a color-coordinate adjustment contribution rate $(\beta)_{(m, n)}$ according to the lightness component contribution rate $(\alpha)_{(m, n)}$. Specifically, as shown in FIG. 9, the ratio controller 230 acquires the luminance gain $(GAIN_L)$ according to the average luminance. The luminance gain $(GAIN_L)$ takes on a lower value, as the average luminance becomes higher. Note that the luminance gain $(GAIN_L)$ is a value in a range between the minimum value and 1. The minimum value is a value in a range between 0 and 1.

Figure 10:
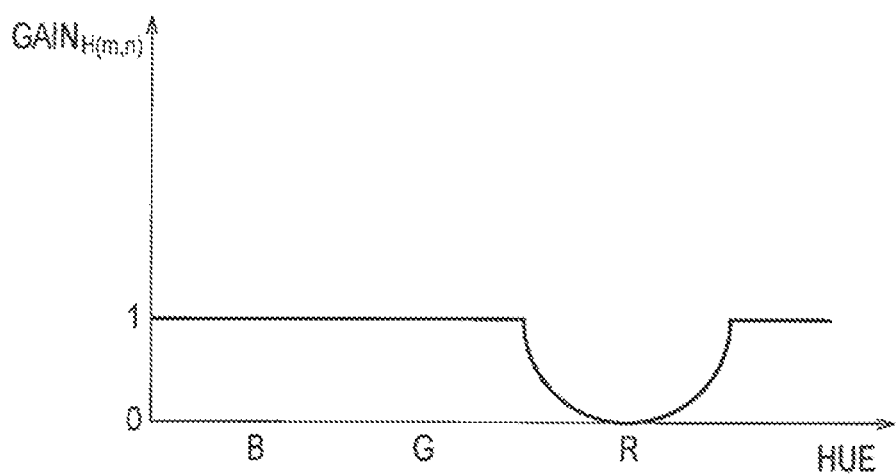
FIG. 10 is a graph showing a hue gain according to Third Embodiment.

As shown in FIG. 10, the ratio controller 230 acquires the hue gain $(GAIN_{H(m, n)})$ according to the hue of the pixel (m, n). The hue gain $(GAIN_{H(m, n)})$ takes on a lower value, as the hue becomes closer to the red hue. Note that the hue gain $(GAIN_{H(m, n)})$ is a value in a range between 0 and 1.

Figure 11:
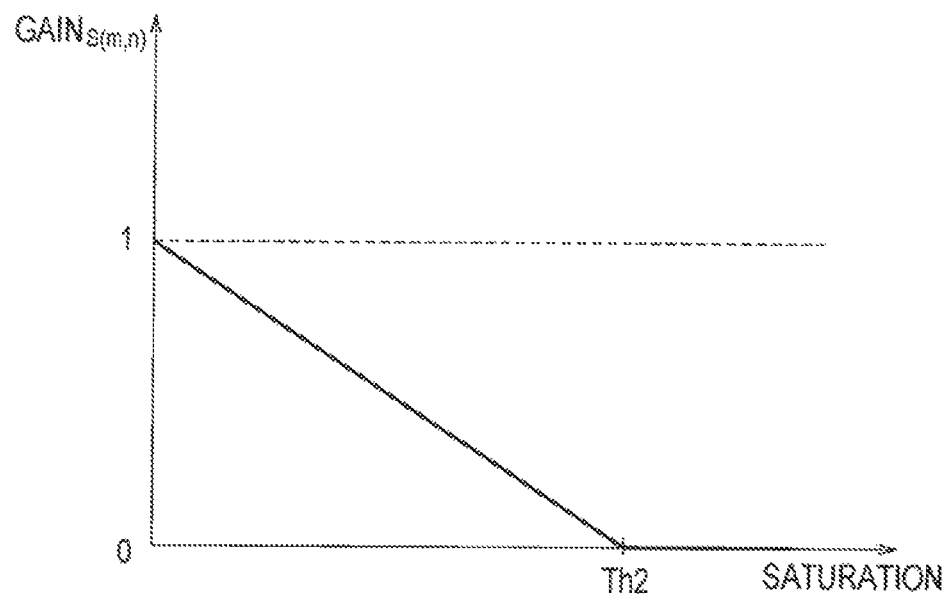
FIG. 11 is a graph showing a saturation gain according to Third Embodiment.

As shown in FIG. 11, the ratio controller 230 acquires the saturation gain $(GAIN_{S(m, n)})$ according to the saturation of the pixel (m, n). Until the saturation reaches a threshold Th2, the saturation gain $(GAIN_{S(m, n)})$ takes on a lower value, as the saturation becomes higher. In contrast, when the saturation exceeds the threshold Th2, the saturation gain $(GAIN_{S(m, n)})$ is maintained at the minimum value (=0). Note that the saturation gain $(GAIN_{S(m, n)})$ is a value in a range between 0 and 1.

Subsequently, the ratio controller 230 acquires the lightness component contribution rate $(\alpha)_{(m, n)}$ to be used for the pixel (m, n) based on the luminance gain $(GAIN_L)$, the hue gain $(GAIN_{H(m, n)})$ and the saturation gain $(GAIN_{S(m, n)})$. For example, the ratio controller 230 acquires the lightness component contribution rate $(\alpha)_{(m, n)}$ to be used for the pixel (m, n) in accordance with the following equation (4).

[Formula 4]

$$\alpha_{(m,n)} = GAIN_L \times GAIN_{H(m,n)} \times GAIN_{S(m,n)} \quad \text{Equation (4)}$$

The display element controller 240 controls the ratio of a color-coordinate adjustment signal and a lightness adjustment signal for the pixel (m, n) based on the lightness component contribution rate $(\alpha)_{(m, n)}$ acquired from the ratio controller 230. In sum, the display element controller 240 controls the ratio of the color-coordinate adjustment signal and the lightness adjustment signal, for each pixel.

(Operation of Projection-Type Image Display Device)

Figure 12:
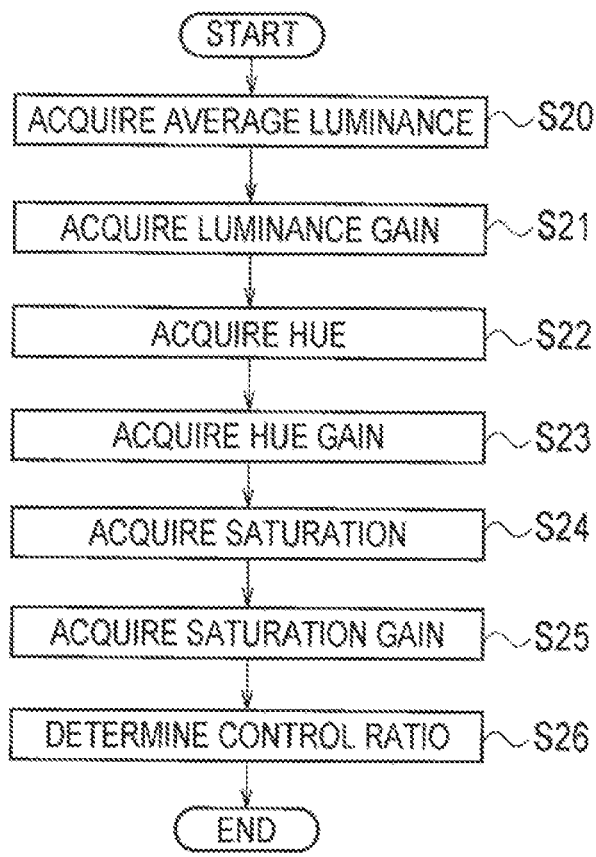
FIG. 12 is a flowchart showing an operation of the signal processing device 200 according to Third Embodiment.

Hereinbelow, an operation of the projection-type image display device according to Third Embodiment is described with reference to the drawing. FIG. 12 is a flowchart showing an operation of the projection-type image display device 100 (signal processing device 200) according to Third Embodiment.

As shown in FIG. 12, in step 20, the signal processing device 200 acquires an average luminance of multiple pixels forming an image (frame) based on an image input signal.

In step 21, the signal processing device 200 acquires a luminance gain $(GAIN_L)$ based on the average luminance acquired in step 20.

In step 22, the signal processing device 200 acquires a hue of a pixel (m, n) forming the image (frame), based on an image input signal.

In step 23, the signal processing device 200 acquires a hue gain $(GAIN_{H(m, n)})$ based on the hue acquired in step 22.

In step 24, the signal processing device 200 acquires a saturation of the pixel (m, n) forming the image (frame), based on the image input signal.

In step 25, the signal processing device 200 acquires a saturation gain $(GAIN_{S(m, n)})$ based on the saturation acquired in step 24.

In step 26, the signal processing device 200 determines a lightness component contribution rate $(\alpha)$ and a color-coordinate adjustment contribution rate $(\beta)$. Specifically, the signal processing device 200 determines a lightness component contribution rate $(\alpha)_{(m, n)}$ to be used for the pixel (m, n) according to the gains acquired in step 21, step 23, and step 25.

It should be noted that the signal processing device 200 repeats processing performed in step 22 to step 26, for all the pixels forming the image (frame).

(Advantages and Effects)

In Third Embodiment, the ratio controller 230 acquires the lightness component contribution rate $(\alpha)_{(m, n)}$ based on the average luminance, the hue, and the saturation, for each pixel forming the image (frame). The display element controller 240 controls the ratio of the color-coordinate adjustment signal and the lightness adjustment signal for each pixel.

Thus, it is possible to effectively utilize the color reproduction range of the liquid crystal panel 30 while appropriately suppressing the difference between the color coordinates of the image and the color coordinates of the actual one, for each pixel.

[Fourth Embodiment]

Hereinbelow, Fourth Embodiment is described with reference to the drawings. Hereinbelow, a description is given mainly of a difference between First Embodiment described above and Fourth Embodiment.

Specifically, in First Embodiment described above, the lightness component contribution rate $(\alpha)$ is determined based on the number of pixels whose saturations exceed the predetermined threshold in the specific hue (here, red hue). In contrast, in Fourth Embodiment, the lightness component contribution rate $(\alpha)$ is determined based on a distribution (a hue average value and a hue variance) of values of pixels having the specific hue (here, red hue).

(Functions of Projection-Type Image Display Device)

Figure 13:
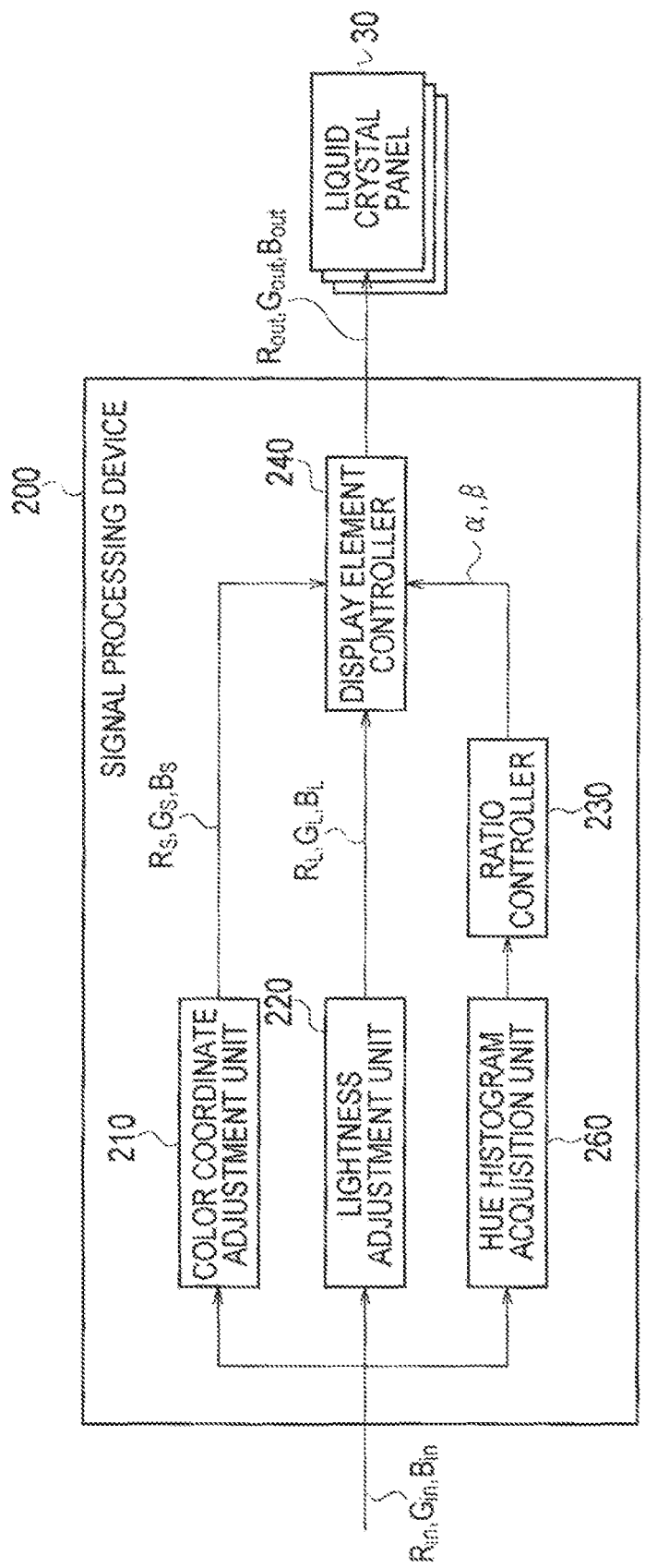
FIG. 13 is a block diagram showing a configuration of a signal processing device 200 according to Fourth Embodiment.

Hereinbelow, functions of the projection-type image display device according to Fourth Embodiment are described with reference to the drawings. FIG. 13 is a block diagram showing functions of a projection-type image display device 100 (signal processing device 200) according to Fourth Embodiment. In FIG. 13, the same reference numerals denote portions in the same configuration as in FIG. 4.

As shown in FIG. 13, the signal processing device 200 includes a hue histogram acquisition unit 260 in addition to the configuration shown in FIG. 4.

The hue histogram acquisition unit 260 acquires a histogram of hues of pixels having the specific hue (here, red hue). Subsequently, the hue histogram acquisition unit 260 calculates a hue average value and a hue variance of the pixels having the specific hue (here, red hue).

Figure 14:
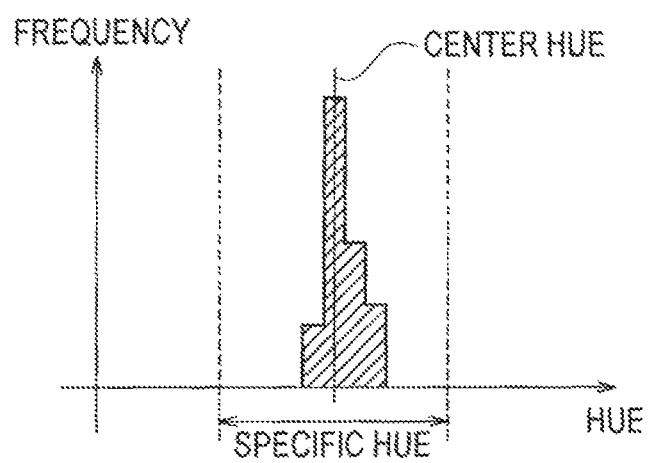
FIG. 14 is a graph showing a histogram according to Fourth Embodiment.
Figure 15:
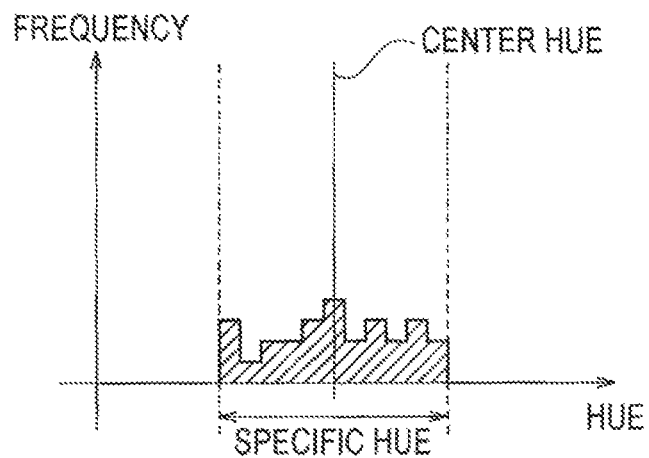
FIG. 15 is a graph showing a histogram according to Fourth Embodiment.

For example, the hue histogram acquisition unit 260 acquires a histogram shown in FIG. 14 or FIG. 15. In the histogram shown in FIG. 14, hues of the pixels are distributed locally around the center hue in the specific hue (here, red hue). That is, the hue average value is close to the center hue and the hue variance is small. In contrast, the histogram shown in FIG. 15, the hues of pixels are distributed dispersively in the specific hue (here, red hue). That is, the hue average value is close to the center hue and the hue variance is large.

The ratio controller 230 described above determines the lightness component contribution rate ($\alpha$) based on the distribution (the hue average value and the hue variance) of values of pixels having the specific hue (here, red hue). That is, the ratio controller 230 determines the lightness component contribution rate ($\alpha$) and the color-coordinate adjustment contribution rate ($\beta$).

Figure 16:
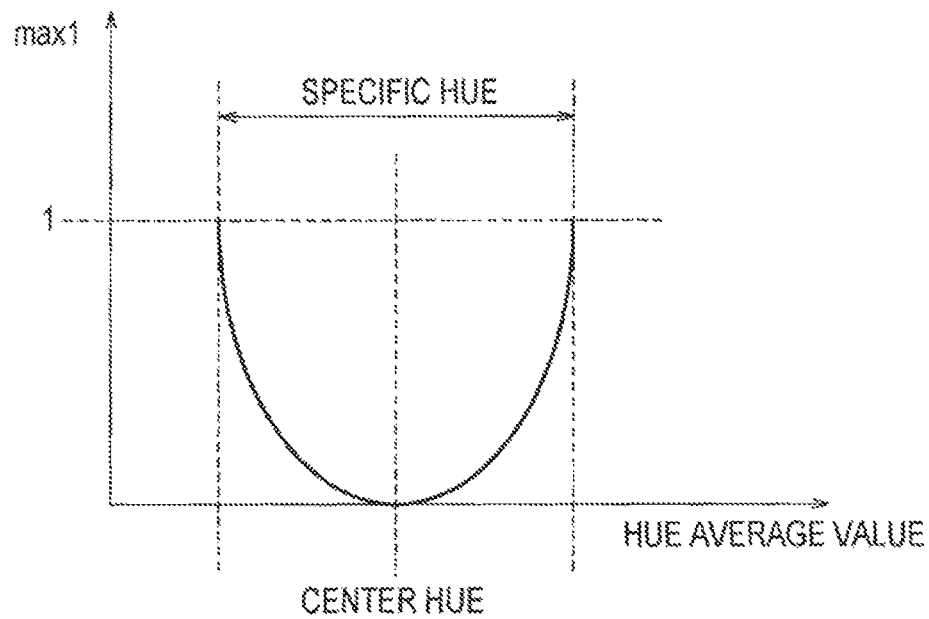
FIG. 16 is a graph showing how a parameter a according to Fourth Embodiment is determined.
Figure 17:
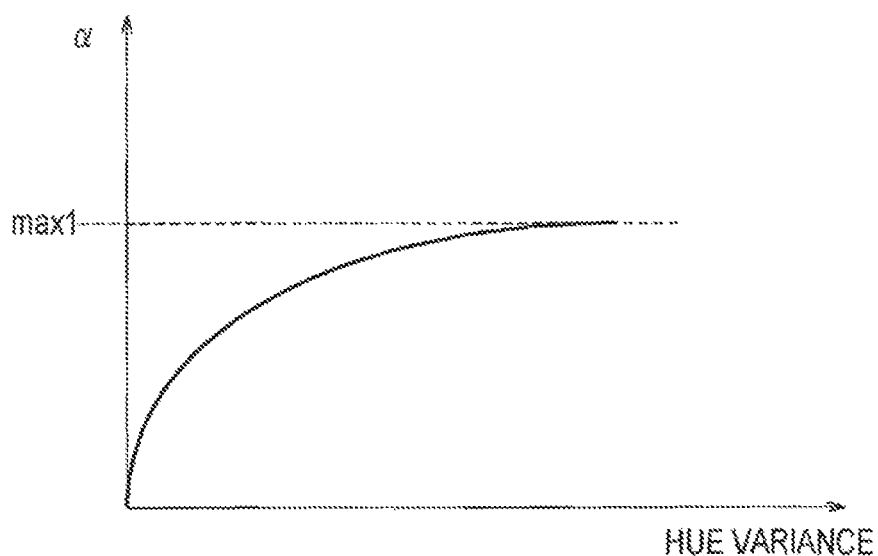
FIG. 17 is a graph showing how a parameter a according to Fourth Embodiment is determined.

Specifically, the ratio controller 230 determines a parameter max1 based on the hue average value, as shown in FIG. 16. Subsequently, the ratio controller 230 determines lightness component contribution rate ($\alpha$) based on the hue variance, as shown in FIG. 17. Note that the upper limit of the lightness component contribution rate ($\alpha$) is restricted by the parameter max1.

Note that as shown in FIG. 16, the value of the parameter max1 becomes smaller, as the hue average value becomes closer to the center hue. In addition, as shown in FIG. 17, the value of the lightness component contribution rate ($\alpha$) becomes smaller, as the hue variance becomes smaller.

That is, the value of the lightness component contribution rate ($\alpha$) becomes smaller, as the hue average value becomes closer to the center hue, or as the hue variance becomes smaller. Thus, the color-coordinate adjustment contribution rate ($\beta$) becomes larger, as the hue average value becomes closer to the center hue, or as the hue variance becomes smaller.

In contrast, as shown in FIG. 16, the value of the parameter max1 becomes larger, as the hue average value becomes farther from the center hue. In addition, as shown in FIG. 17, the value of the lightness component contribution rate ($\alpha$) becomes larger, as the hue variance becomes larger.

That is, the value of the lightness component contribution rate ($\alpha$) becomes larger, as the hue average value becomes farther from the center hue, or as the hue variance becomes larger. Thus, the color-coordinate adjustment contribution rate ($\beta$) becomes smaller, as the hue average value becomes farther from the center hue, or as the hue variance becomes larger.

(Advantages and Effects)

In Fourth Embodiment, the value of the color-coordinate adjustment contribution rate ($\beta$) becomes smaller, as the hue average value becomes farther from the center hue, or as the hue variance becomes larger. Thus, in an image where a glare or the like is less likely to occur, the color reproduction range of the liquid crystal panel 30 can be utilized effectively.

[Fifth Embodiment]

Hereinbelow, Fifth Embodiment is described with reference to the drawings. Hereinbelow, a description is given mainly of a difference between First Embodiment described above and Fifth Embodiment.

Specifically, in First Embodiment described above, the lightness component contribution rate ($\alpha$) is determined based on the number of pixels whose saturations exceed the predetermined threshold in the specific hue (here, red hue). In contrast, in Fifth Embodiment, the lightness component contribution rate ($\alpha$) is determined based on a distribution (a saturation average value and a saturation variance) of values of pixels having the specific hue (here, red hue).

(Functions of Projection-Type Image Display Device)

Figure 18:
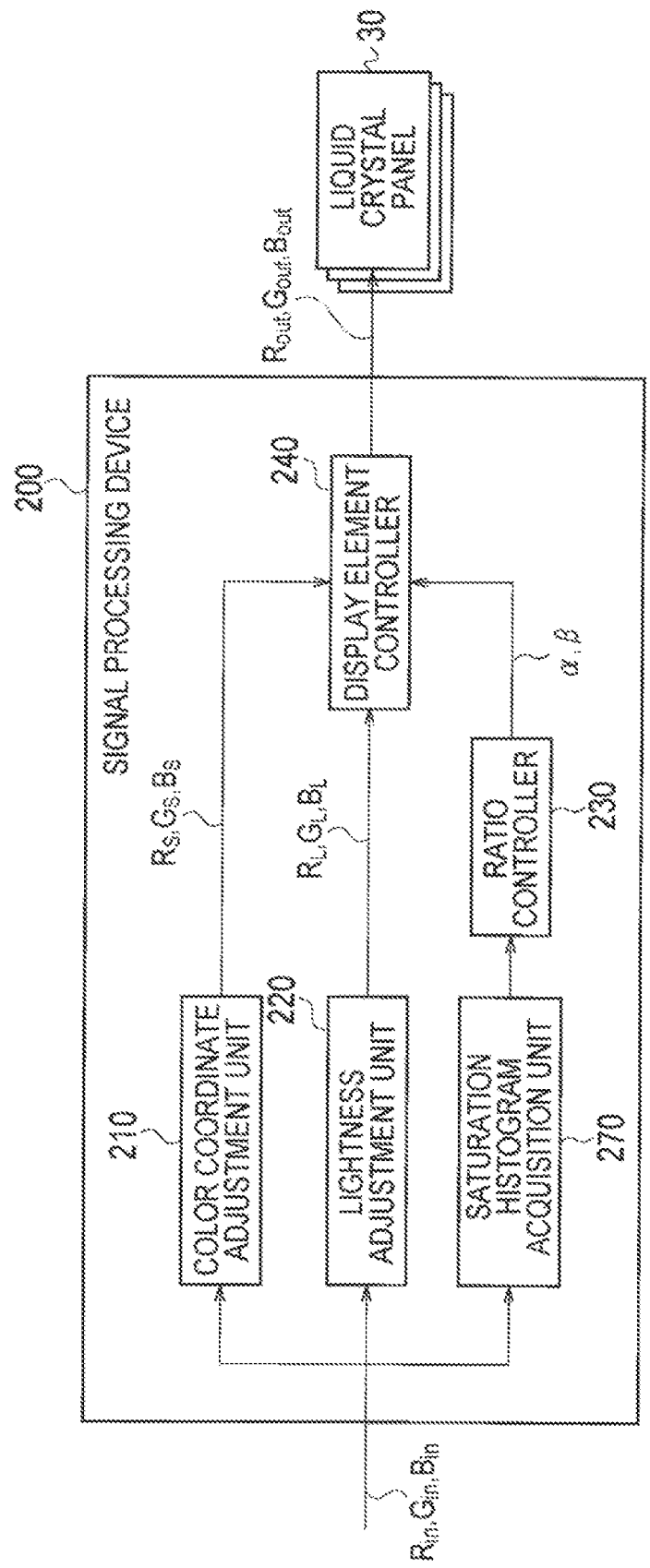
FIG. 18 is a block diagram showing a configuration of a signal processing device 200 according to Fifth Embodiment.

Hereinbelow, functions of the projection-type image display device according to Fifth Embodiment are described with reference to the drawings. FIG. 18 is a block diagram showing functions of a projection-type image display device 100 (signal processing device 200) according to Fifth Embodiment. In FIG. 18, the same reference numerals denote portions in the same configuration as in FIG. 4.

As shown in FIG. 18, the signal processing device 200 includes a saturation histogram acquisition unit 270 in addition to the configuration shown in FIG. 4.

The saturation histogram acquisition unit 270 acquires a histogram of saturations of pixels having the specific hue (here, red hue). Subsequently, the saturation histogram acquisition unit 270 calculates a saturation average value and a saturation variance of the pixels having the specific hue (here, red hue).

Figure 19:
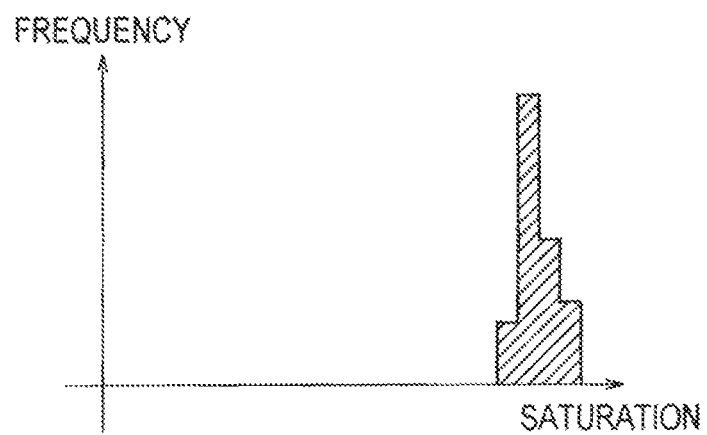
FIG. 19 is a graph showing a histogram according to Fifth Embodiment.
Figure 20:
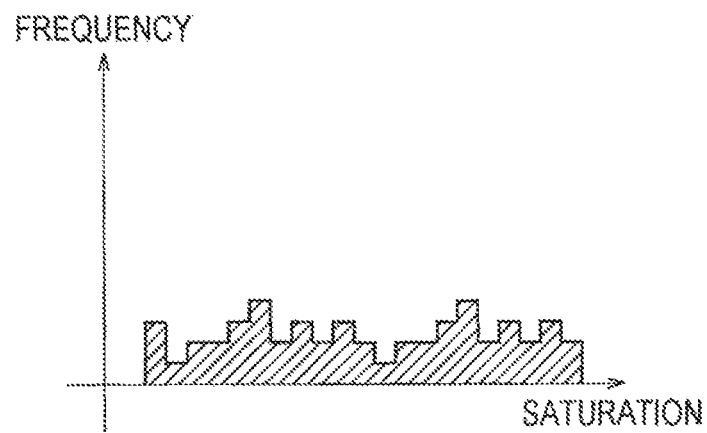
FIG. 20 is a graph showing a histogram according to Fifth Embodiment.

For example, the saturation histogram acquisition unit 270 acquires a histogram shown in FIG. 19 or FIG. 20. In the histogram shown in FIG. 19, saturations of the pixels are distributed locally on the higher-saturation side in the specific hue (here, red hue). That is, the saturation average value is high and the saturation variance is small. In contrast, the histogram shown in FIG. 20, the saturations of pixels are distributed dispersively in the specific hue (here, red hue). That is, the saturation average value is low and the saturation variance is large.

The ratio controller 230 described above determines the lightness component contribution rate ($\alpha$) based on the distribution (the saturation average value and the saturation variance) of values of pixels having the specific hue (here, red hue). That is, the ratio controller 230 determines the lightness component contribution rate ($\alpha$) and the color-coordinate adjustment contribution rate ($\beta$).

Figure 21:
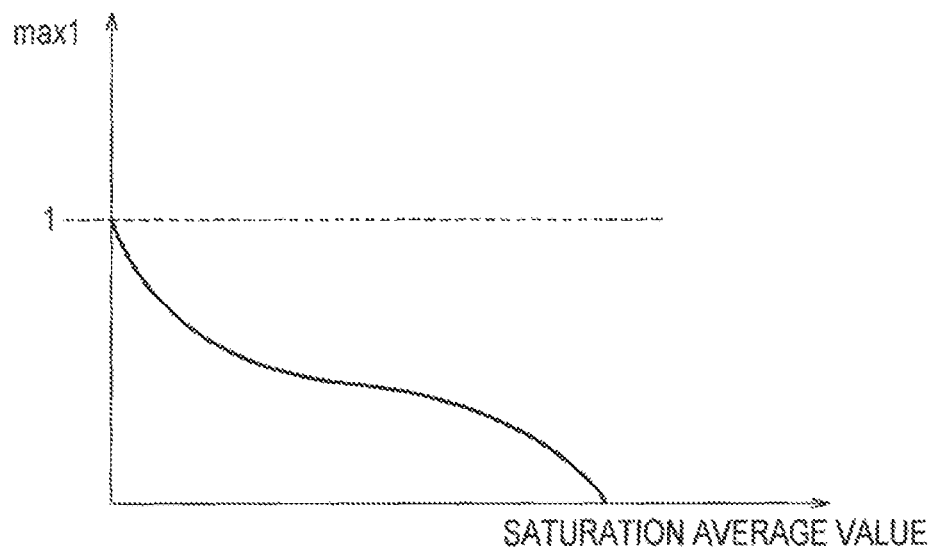
FIG. 21 is a graph showing how a parameter a according to Fifth Embodiment is determined.
Figure 22:
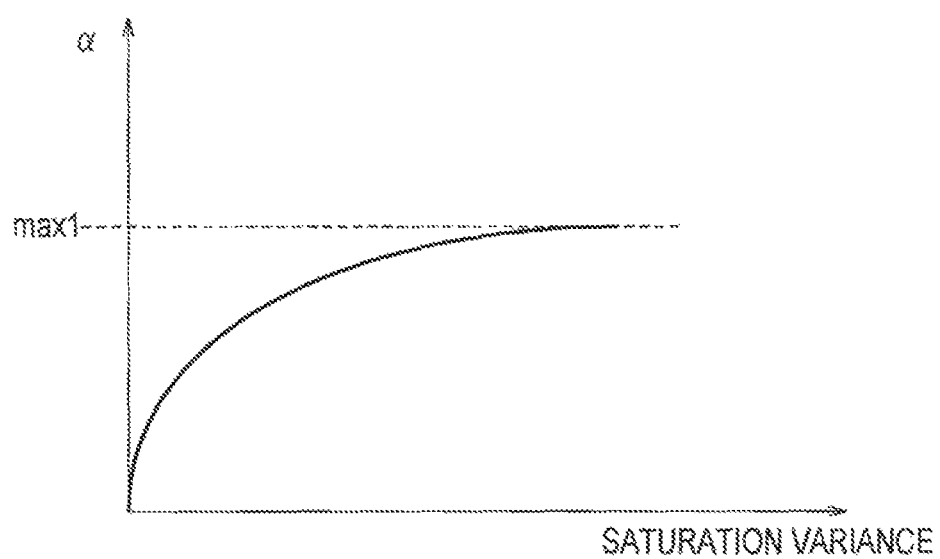
FIG. 22 is a graph showing how a parameter a according to Fifth Embodiment is determined.

Specifically, the ratio controller 230 determines a parameter max1 based on the saturation average value, as shown in FIG. 21. Subsequently, the ratio controller 230 determines lightness component contribution rate ($\alpha$) based on the saturation variance, as shown in FIG. 22. Note that the upper limit of the lightness component contribution rate ($\alpha$) is restricted by the parameter max1.

Note that as shown in FIG. 21, the value of the parameter max1 becomes smaller, as the saturation average value becomes higher. In addition, as shown in FIG. 22, the value of the lightness component contribution rate ($\alpha$) becomes smaller, as the saturation variance becomes smaller.

That is, the value of the lightness component contribution rate ($\alpha$) becomes smaller, as the saturation average value becomes higher, or as the saturation variance becomes smaller. Thus, the color-coordinate adjustment contribution rate ($\beta$) becomes larger, as the saturation average value becomes higher, or as the saturation variance becomes smaller.

Note that as shown in FIG. 21, the value of the parameter maxi becomes larger, as the saturation average value becomes lower. In addition, as shown in FIG. 22, the value of the lightness component contribution rate ($\alpha$) becomes larger, as the saturation variance becomes larger.

That is, the value of the lightness component contribution rate ($\alpha$) becomes larger, as the saturation average value becomes lower, or as the saturation variance becomes larger.

Thus, the value of the color-coordinate adjustment contribution rate (β) becomes smaller, as the saturation average value becomes lower, or as the saturation variance becomes larger.

(Advantages and Effects)

In Fifth Embodiment, the value of the color-coordinate adjustment contribution rate (β) becomes smaller, as the saturation average value becomes lower, or as the saturation variance becomes larger. Thus, in an image where a glare or the like is less likely to occur, the color reproduction range of the liquid crystal panel 30 can be utilized effectively.

[Sixth Embodiment]

Hereinbelow, Sixth Embodiment is described with reference to the drawings. Hereinbelow, a description is given mainly of a difference between First Embodiment described above and Sixth Embodiment.

Specifically, in First Embodiment described above, the lightness component contribution rate (α) is determined based on the number of pixels whose saturations exceed the predetermined threshold in the specific hue (here, red hue). In contrast, in Sixth Embodiment, the lightness component contribution rate (α) is determined based on a high-frequency component (a high-frequency component of a hue) of pixels having the specific hue (here, red hue).

(Functions of Projection-Type Image Display Device)

Figure 23:
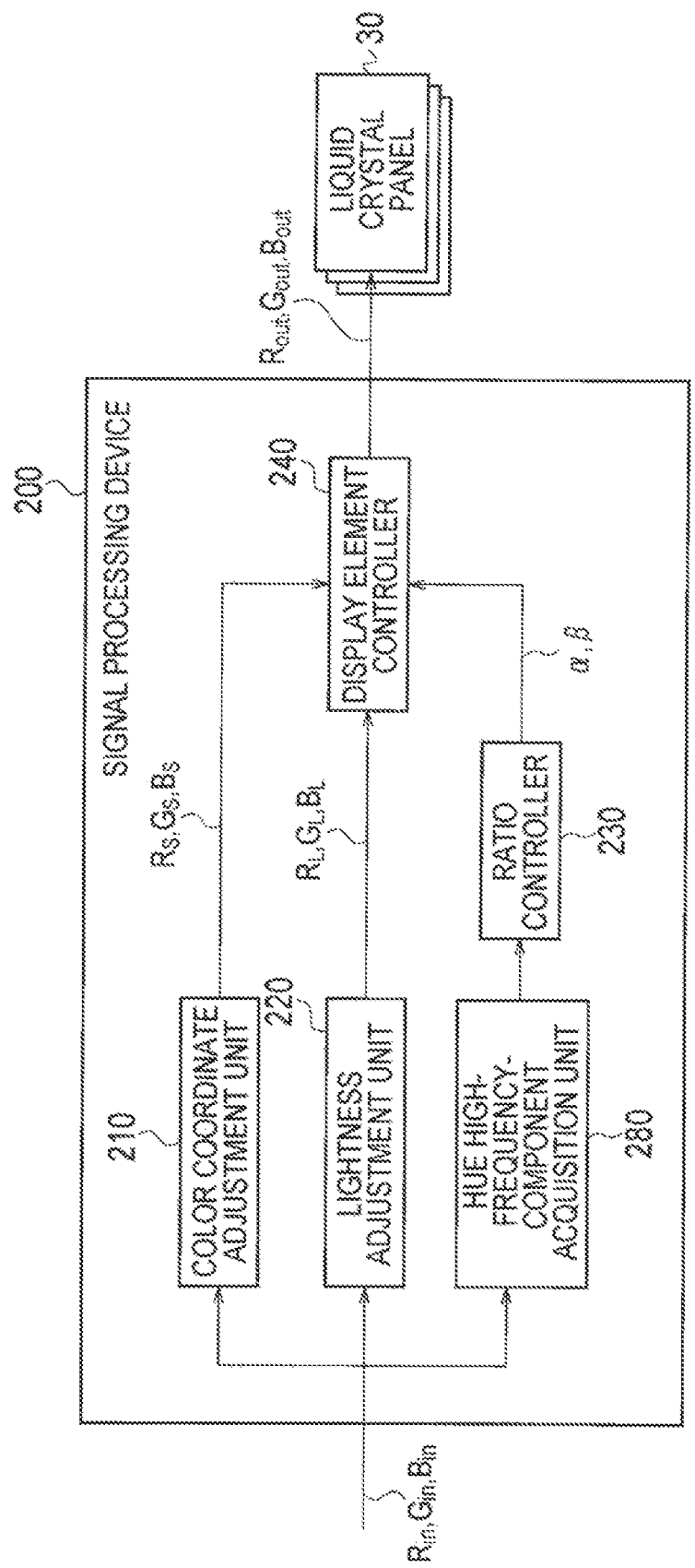
FIG. 23 is a block diagram showing a configuration of a signal processing device 200 according to Sixth Embodiment.

Hereinbelow, functions of the projection-type image display device according to Sixth Embodiment are described with reference to the drawings. FIG. 23 is a block diagram showing functions of a projection-type image display device 100 (signal processing device 200) according to Sixth Embodiment. In FIG. 23, the same reference numerals denote portions in the same configuration as in FIG. 4.

As shown in FIG. 23, the signal processing device 200 includes a hue high-frequency-component acquisition unit 280 in addition to the configuration shown in FIG. 4.

The hue high-frequency-component acquisition unit 280 acquires a high-frequency component of a hue (hereinafter, hue high-frequency component) from each of pixels having the specific hue (here, red hue). Specifically, the hue high-frequency-component acquisition unit 280 firstly identifies a pixel whose saturation is equal to or higher than a predetermined threshold (for example, ½ of the maximum saturation) in the specific hue (here, red hue), as a control target pixel. Secondly, the hue high-frequency-component acquisition unit 280 calculates a high-frequency component of the control target pixel. Thirdly, the hue high-frequency-component acquisition unit 280 calculates a sum of hue high-frequency components of all the control target pixels.

Figures 24, 25:
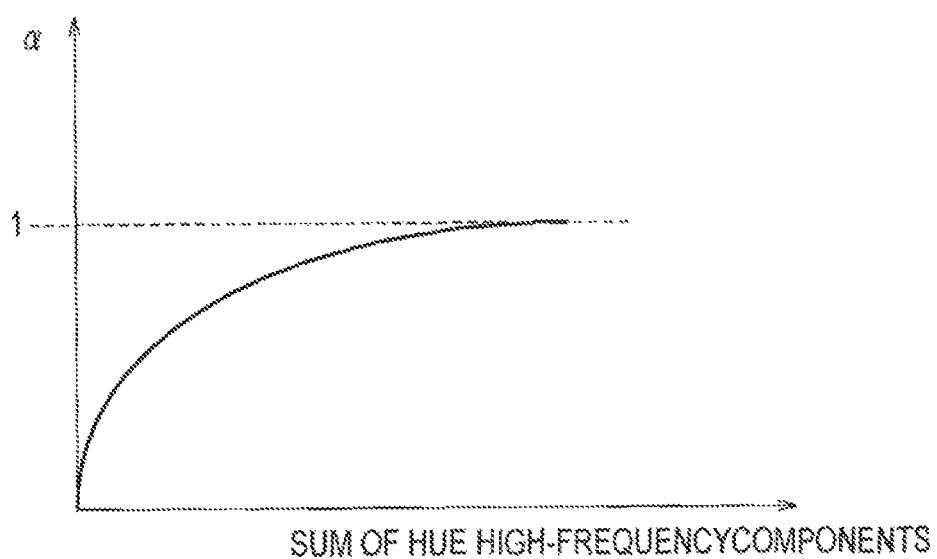
FIG. 24 is a diagram showing a filter according to Sixth Embodiment.
FIG. 25 is a graph showing how a parameter a according to Sixth Embodiment is determined.

For example, the hue high-frequency-component acquisition unit 280 calculates a hue high-frequency component FH(m, n) of a control target pixel (m, n) by using a filter shown in FIG. 24. Values shown in FIG. 24 are coefficients by which hue values of a pixel (m−1, n−1) to a pixel (m+1, n+1) are multiplied, respectively. That is, the hue high-frequency-component acquisition unit 280 calculates the hue high-frequency component FH(m, n) of the control target pixel (m, n) in accordance with the following equation.

$$FH(m,n)=8\times H(m,n)-1\times H(m-1,n-1)-1\times H(m,n-1)-1\times H(m+1,n-1)-1\times H(m-1,n)-1\times H(m+1,n)-1\times H(m-1,n+1)-1\times H(m,n+1)-1\times H(m+1,n+1)$$ [Formula 5]

where, H(x, y) is a hue value of a pixel having coordinates (x, y).

The ratio controller 230 described above determines the lightness component contribution rate (α) based on the sum of the hue high-frequency components calculated by the hue high-frequency-component acquisition unit 280. That is, the ratio controller 230 determines the lightness component contribution rate (α) and the color-coordinate adjustment contribution rate (β). Specifically, the ratio controller 230 determines the lightness component contribution rate (α) based on the sum of the hue high-frequency components, as shown in FIG. 25.

Note that, as shown in FIG. 25, the value of the lightness component contribution rate (α) becomes larger, as the sum of the hue high-frequency components becomes larger. Thus, the value of the color-coordinate adjustment contribution rate (β) becomes smaller, as the sum of the hue high-frequency components becomes larger.

In contrast, as shown in FIG. 25, the value of the lightness component contribution rate (α) becomes smaller, as the sum of the hue high-frequency components becomes smaller. Thus, the value of the color-coordinate adjustment contribution rate (β) becomes larger, as the sum of the hue high-frequency components becomes smaller.

(Advantages and Effects)

In Sixth Embodiment, the value of the color-coordinate adjustment contribution rate (β) becomes smaller, as the sum of the hue high-frequency components of the pixels having the specific hue becomes larger. Accordingly, it is possible to inhibit hue tones from being crushed in the specific hue.

[Seventh Embodiment]

Hereinbelow, Seventh Embodiment is described with reference to the drawings. Hereinbelow, a description is given mainly of a difference between First Embodiment described above and Seventh Embodiment.

Specifically, in First Embodiment described above, the lightness component contribution rate (α) is determined based on the number of pixels whose saturations exceed the predetermined threshold in the specific hue (here, red hue). In contrast, in Seventh Embodiment, the lightness component contribution rate (α) is determined based on a high-frequency component (a high-frequency component of a lightness) of pixels having the specific hue (here, red hue).

(Functions of Projection-Type Image Display Device)

Figure 26:
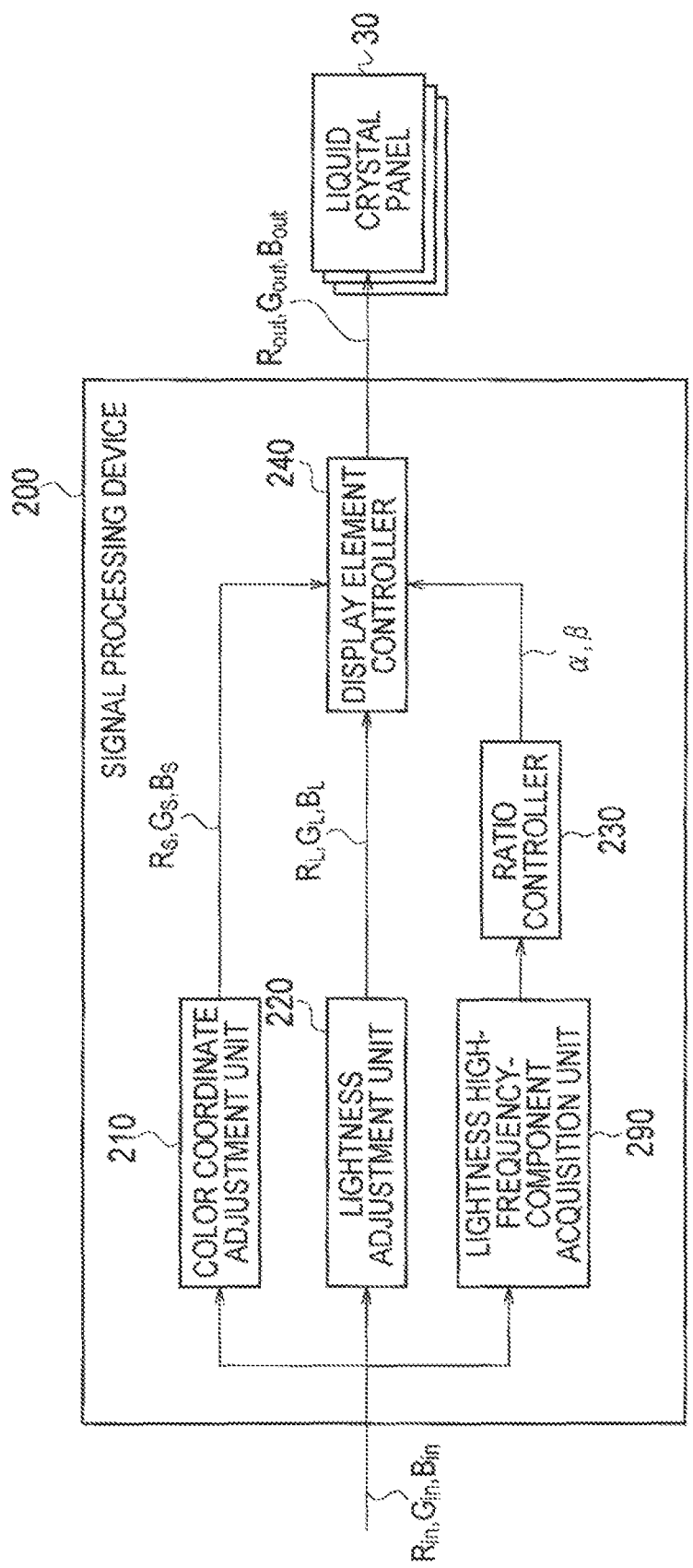
FIG. 26 is a block diagram showing a signal processing device 200 according to Seventh Embodiment.

Hereinbelow, functions of the projection-type image display device according to Seventh Embodiment are described with reference to the drawings. FIG. 26 is a block diagram showing functions of a projection-type image display device 100 (signal processing device 200) according to Seventh Embodiment. In FIG. 26, the same reference numerals denote portions in the same configuration as in FIG. 4.

As shown in FIG. 26, the signal processing device 200 includes a lightness high-frequency-component acquisition unit 290 in addition to the configuration shown in FIG. 4.

The lightness high-frequency-component acquisition unit 290 acquires a high-frequency component of a lightness (hereinafter, lightness high-frequency component) from each of pixels having the specific hue (here, red hue). Specifically, the lightness high-frequency-component acquisition unit 290 firstly identifies a pixel whose saturation is equal to or higher than a predetermined threshold (for example, ½ of the maximum saturation) in the specific hue (here, red hue), as a control target pixel. Secondly, the lightness high-frequency-component acquisition unit 290 calculates a lightness high-frequency component of the control target pixel. Thirdly, the lightness high-frequency-component acquisition unit 290 calculates a sum of lightness high-frequency components of all the control target pixels.

Figures 27, 28:
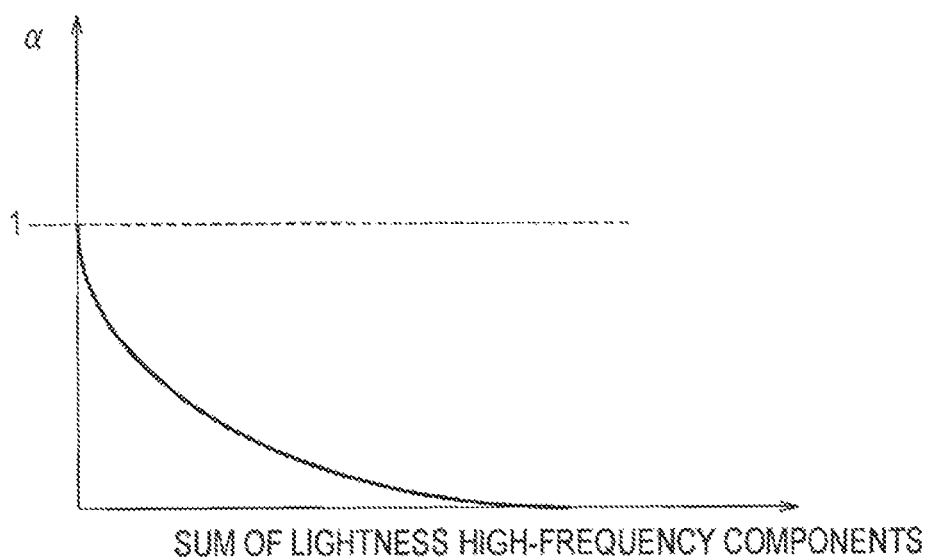
FIG. 27 is a diagram showing a filter according to Seventh Embodiment.
FIG. 28 is a graph showing how a parameter a according to Seventh Embodiment is determined.

For example, the lightness high-frequency-component acquisition unit 290 calculates a lightness high-frequency component FL(m, n) of a control target pixel (m, n) by using a filter shown in FIG. 27. Values shown in FIG. 27 are coefficients by which lightness values of a pixel (m−1, n−1) to a pixel (m+1, n+1) are multiplied, respectively. That is, the lightness high-frequency-component acquisition unit 290 calculates the lightness high-frequency component FL(m, n) of the control target pixel (m, n) in accordance with the following equation.

$$FL(m,n)=8\times L(m,n)-1\times L(m-1,n-1)-1\times L(m,n-1)-1\times L(m+1,n-1)-1\times L(m-1,n)-1\times L(m+1,n)-1\times L(m-1,n+1)-1\times L(m,n+1)-1\times L(m+1,n+1)$$ [Formula 6]

where, L(x, y) is a lightness value of a pixel having coordinates (x, y).

The ratio controller 230 described above determines the lightness component contribution rate ($\alpha$) based on the sum of the lightness high-frequency components calculated by the lightness high-frequency-component acquisition unit 290. That is, the ratio controller 230 determines the lightness component contribution rate ($\alpha$) and the color-coordinate adjustment contribution rate ($\beta$). Specifically, the ratio controller 230 determines the lightness component contribution rate ($\alpha$) based on the sum of the lightness high-frequency components, as shown in FIG. 28.

Note that, as shown in FIG. 28, the value of the lightness component contribution rate ($\alpha$) becomes smaller, as the sum of the lightness high-frequency components becomes larger. Thus, the value of the color-coordinate adjustment contribution rate ($\beta$) becomes larger, as the sum of the lightness high-frequency components becomes larger.

In contrast, as shown in FIG. 28, the value of the lightness component contribution rate ($\alpha$) becomes larger, as the sum of the lightness high-frequency components becomes smaller. Thus, the value of the color-coordinate adjustment contribution rate ($\beta$) becomes smaller, as the sum of the lightness high-frequency components becomes smaller.

(Advantages and Effects)

In Seventh Embodiment, the value of the lightness component contribution rate ($\alpha$) becomes smaller, as the sum of the lightness high-frequency components of the pixels having the specific hue becomes larger. Accordingly, it is possible to inhibit lightness tones from being crushed in the specific hue.

As described above, the "lightness" according to the embodiments is a term representing brightness. Thus, the "lightness" should be understood as a term representing a wide-range concept including luminance.

However, in Seventh Embodiment, it is preferable that the lightness be lightness (V) obtained by an HSV conversion. In addition, in Seventh Embodiment, it is preferable that the lightness adjustment processing be processing of adjusting a lightness component (V) of an image input signal.

Note that the lightness may be luminance (Y) obtained by a YUV conversion. In such a case, it is preferable that the lightness adjustment processing be processing of adjusting a luminance component (Y) of the image input signal.

[Eighth Embodiment]

Hereinbelow, Eighth Embodiment is described with reference to the drawings. Hereinbelow, a description is given mainly of a difference between First Embodiment described above and Eighth Embodiment.

Specifically, in First Embodiment described above, the lightness component contribution rate ($\alpha$) is determined based on the number of pixels whose saturations exceed the predetermined threshold in the specific hue (here, red hue). In contrast, in Eighth Embodiment, the lightness component contribution rate ($\alpha$) is controlled for each of multiple pixels forming an image (frame).

(Functions of Projection-Type Image Display Device)

Figure 29:
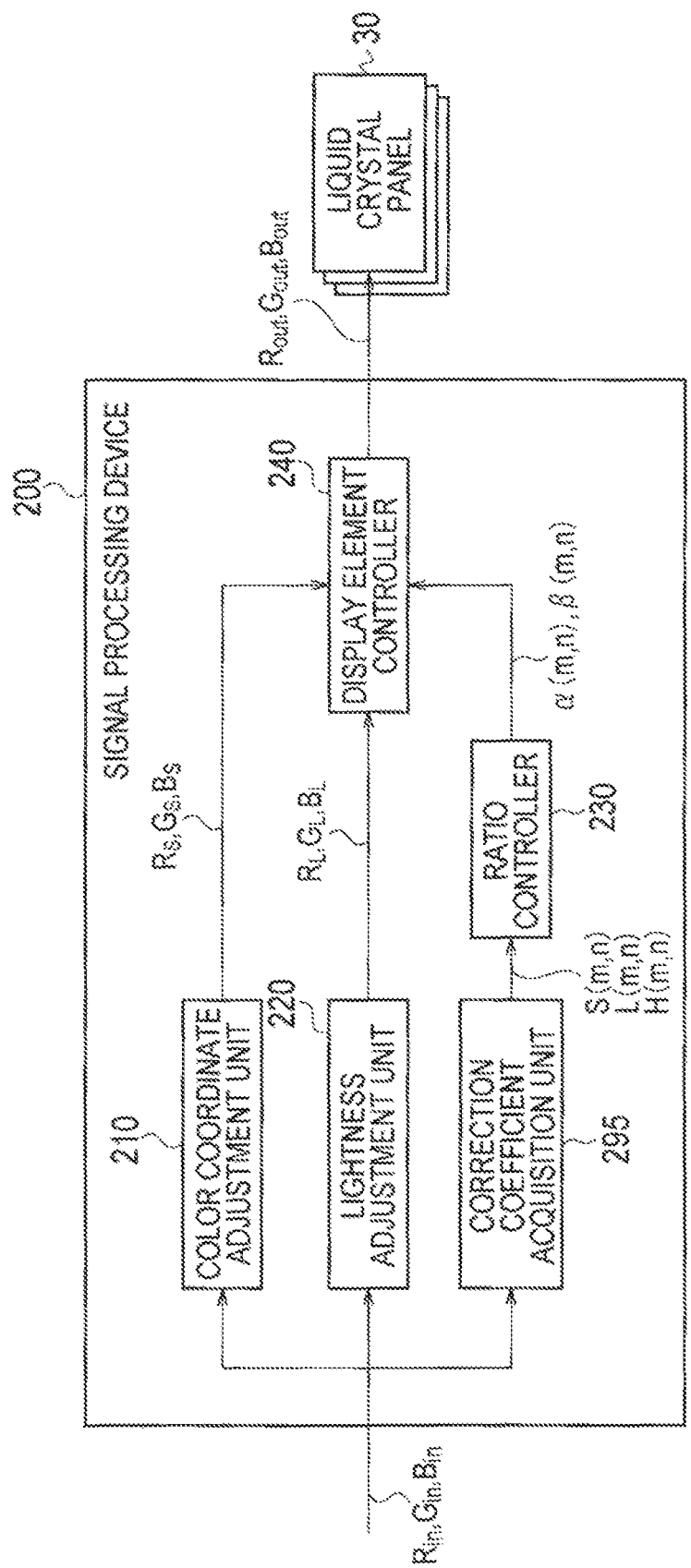
FIG. 29 is a block diagram showing a configuration of a signal processing device 200 according to Eighth Embodiment.

Hereinbelow, functions of the projection-type image display device according to Eighth Embodiment are described with reference to the drawings. FIG. 29 is a block diagram showing functions of a projection-type image display device 100 (signal processing device 200) according to Eighth Embodiment. In FIG. 29, the same reference numerals denote portions in the same configuration as in FIG. 4.

As shown in FIG. 29, the signal processing device 200 includes a correction coefficient acquisition unit 295 in addition to the configuration shown in FIG. 4.

The correction coefficient acquisition unit 295 acquires a saturation, a luminance, and a hue for each pixel. Subsequently, the correction coefficient acquisition unit 295 acquires a saturation correction coefficient S, a luminance correction coefficient L, and a hue correction coefficient H for each pixel. Note that the correction coefficient acquisition unit 295 acquires the saturation correction coefficient S, the luminance correction coefficient L, and the hue correction coefficient H for all the pixels.

Figure 30:
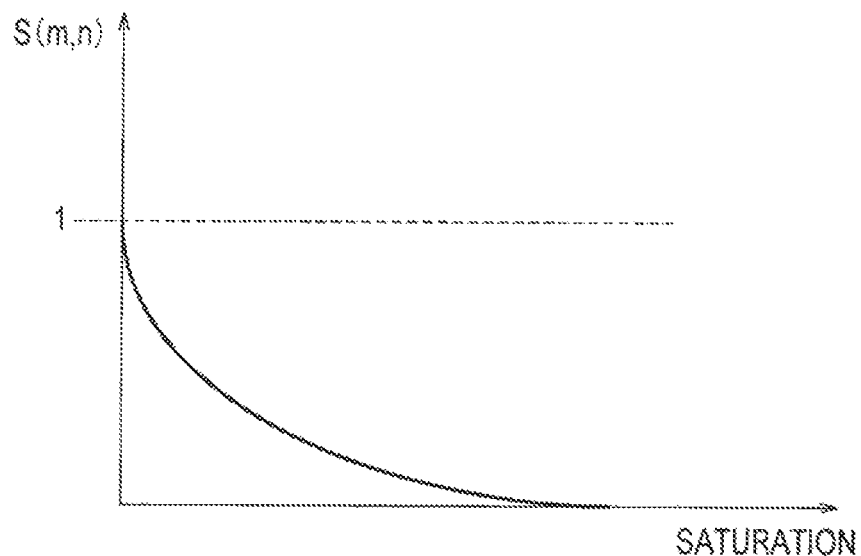
FIG. 30 is a graph showing a parameter S according to Eighth Embodiment.

Firstly, as shown in FIG. 30, the correction coefficient acquisition unit 295 determines a saturation correction coefficient S(m, n) of a pixel (m, n) based on the saturation of the pixel (m, n). As shown in FIG. 30, the saturation correction coefficient S(m, n) becomes smaller, as the saturation of the pixel (m, n) becomes higher.

Figure 31:
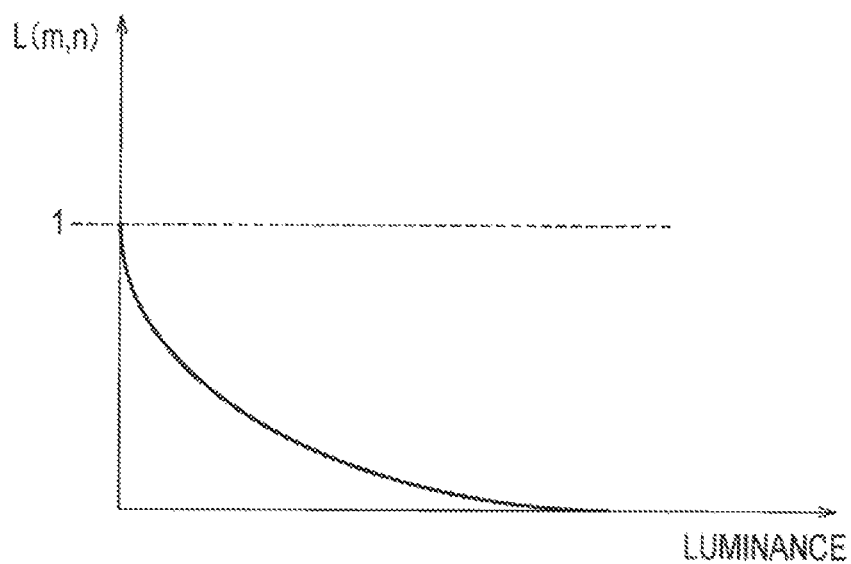
FIG. 31 is a graph showing a parameter L according to Eighth Embodiment.

Secondly, as shown in FIG. 31, the correction coefficient acquisition unit 295 determines a luminance correction coefficient L(m, n) of the pixel (m, n) based on the luminance of the pixel (m, n). As shown in FIG. 31, the luminance correction coefficient L(m, n) becomes smaller, as the luminance of the pixel (m, n) becomes higher.

Figure 32:
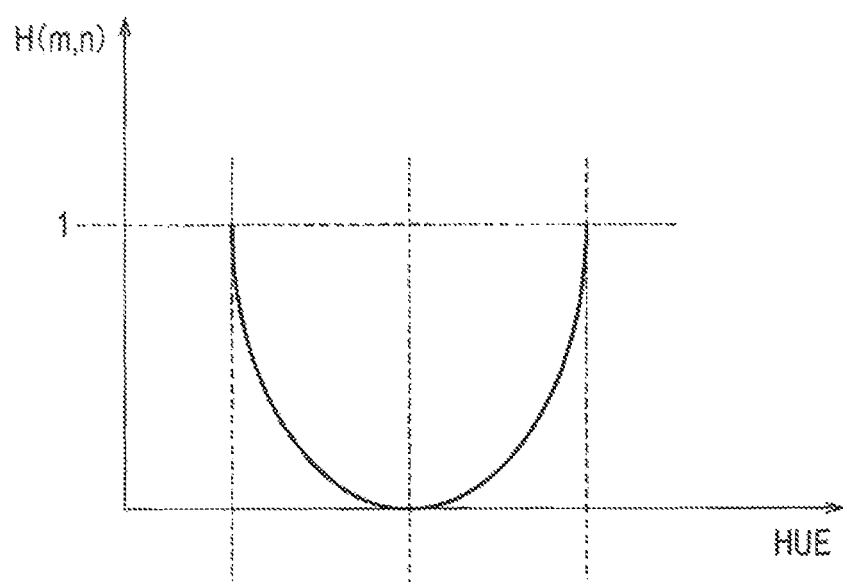
FIG. 32 is a graph showing a parameter H according to Eighth Embodiment.

Thirdly, as shown in FIG. 32, the correction coefficient acquisition unit 295 determines a hue correction coefficient H(m, n) of the pixel (m, n) based on the hue of the pixel (m, n). As shown in FIG. 32, the hue correction coefficient H(m, n) becomes smaller, as the hue of the pixel (m, n) becomes closer to the center hue. Note that the center hue is a hue representing the center in the specific hue (here, red hue).

The ratio controller 230 corrects the lightness component contribution rate ($\alpha$) for each pixel based on the saturation correction coefficient S(m, n), the luminance correction coefficient L(m, n), and the hue correction coefficient H(m, n). That is, the ratio controller 230 corrects the lightness component contribution rate ($\alpha$(m, n)) for each pixel. For example, the ratio controller 230 corrects the lightness component contribution rate ($\alpha$(m, n)) in accordance with the following equation.

$$\alpha(m,n)=\alpha\times S(m,n)\times L(m,n)\times H(m,n)$$ [Formula 7]

The ratio controller 230 determines the lightness component contribution rate ($\alpha$(m, n)) for each pixel, in a manner as described above. That is, the ratio controller 230 determines the color-coordinate adjustment contribution rate ($\beta$(m, n)) for each pixel.

Note that as shown in FIG. 30 to FIG. 32: the value of the saturation correction coefficient S becomes smaller, as the saturation becomes higher; the value of the luminance correction coefficient L becomes smaller, as the luminance becomes higher; the value of the hue correction coefficient H becomes smaller, as the hue becomes closer to the center hue. That is, the value of the lightness component contribution rate ($\alpha$(m, n)) becomes smaller, as the saturation becomes higher, as the luminance becomes higher, or as the hue becomes closer to the center hue. Accordingly, the value of the color-coordinate adjustment contribution rate ($\beta$(m, n)) becomes larger, as the saturation becomes higher, the luminance becomes higher, or as the hue becomes closer to the center hue.

In contrast, as shown in FIG. 30 to FIG. 32: the value of the saturation correction coefficient S becomes larger, as the saturation becomes lower; the value of the luminance correction coefficient L becomes larger, as the luminance becomes lower; the value of the hue correction coefficient H becomes larger, as the hue becomes farther from the center hue. That is, the value of the lightness component contribution rate (α(m, n)) becomes larger, as the saturation becomes lower, as the luminance becomes lower, or as the hue becomes farther from the center hue. Accordingly, the value of the color-coordinate adjustment contribution rate (β(m, n)) becomes smaller, as the saturation becomes lower, as the luminance becomes lower, or as the hue becomes farther from the center hue.

[Other Embodiments]

As described above, the present invention has been described by using the above embodiments of the present invention. However, it should not be understood that the description and drawings which constitute part of this disclosure limit the present invention. From this disclosure, various alternative embodiments, examples, and operation techniques will be easily found by those skilled in the art.

In the aforementioned embodiment, the luminance average value is used for acquiring the parameter Lum. However, the present invention is not limited to this. A sum of luminances of pixels forming an image (frame) may be used for acquiring the parameter Lum.

In the aforementioned embodiment, the luminance average value is used for acquiring the parameter $\alpha_{(m, n)}$. However, the present invention is not limited to this. A sum of luminances of pixels forming an image (frame) may be used for acquiring the parameter $\alpha_{(m, n)}$.

In the aforementioned embodiment, the parameter $\alpha_{(m, n)}$ is determined based on the luminance gain ($GAIN_L$), the hue gain ($GAIN_{H(m, n)}$), and the saturation gain ($GAIN_{S(m, n)}$). However, the present invention is not limited to this. The parameter $\alpha_{(m, n)}$ may be determined based on any of the luminance gain ($GAIN_L$), the hue gain ($GAIN_{H(m, n)}$), and the saturation gain ($GAIN_{S(m, n)}$). For example, the parameter $\alpha_{(m, n)}$ may be determined based on the luminance gain ($GAIN_L$) only. The parameter $\alpha_{(m, n)}$ may be determined based on the hue gain ($GAIN_{H(m, n)}$) only. The parameter $\alpha_{(m, n)}$ may be determined based on the saturation gain ($GAIN_{S(m, n)}$) only.

In the aforementioned embodiments, the liquid crystal panel 30 is used as the display device. However, the present invention is not limited to this. An LCOS (Liquid Crystal on Silicon) and a DMD (Digital Micromirror Device) or the like may be used as the display device.

In the aforementioned embodiments, a solid light source is used as a light source. However, the present invention is not limited to this. A UHP lamp emitting white light may be used as the light source.

Industrial Applicability

The present invention can provide a signal processing device and a projection-type image display device which are capable of effectively utilizing the color reproduction range of the display device while suppressing a difference between color coordinates of an image and color coordinates of an actual one, to some extent.

The invention claimed is:

1. A signal processing device configured to convert an image input signal into an image output signal and to output the image output signal to a display device, the signal processing device comprising:
a color-coordinate adjustment unit configured to perform color-coordinate adjustment processing of adjusting color coordinates of the image input signal, according to a color reproduction range of the display device;
a lightness adjustment unit configured to perform lightness adjustment processing of adjusting a lightness component of the image input signal;
an output signal generator configured to generate the image output signal based on the color coordinates adjusted by the color-coordinate adjustment processing and the lightness component adjusted by the lightness adjustment processing;
a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate; and
an acquisition unit configured to acquire a hue of each of pixels forming an image based on the image input signal, wherein as the hue acquired by the acquisition unit becomes closer to the specific hue, the controller increases the color-coordinate adjustment contribution rate while decreasing the lightness component contribution rate.

2. The signal processing device according to claim 1, wherein the acquisition unit is further configured to acquire a luminance of an image based on the image input signal, wherein
as the luminance acquired by the acquisition unit becomes higher, the controller increases the color-coordinate adjustment contribution rate while decreasing the lightness component contribution rate.

3. The signal processing device according to claim 1, wherein the controller controls the color-coordinate adjustment contribution rate and the lightness component contribution rate, for each of pixels.

4. A signal processing device configured to convert an image input signal into an image output signal and to output the image output signal to a display device, the signal processing device comprising:
a color-coordinate adjustment unit configured to perform color-coordinate adjustment processing of adjusting color coordinates of the image input signal, according to a color reproduction range of the display device;
a lightness adjustment unit configured to perform lightness adjustment processing of adjusting a lightness component of the image input signal;
an output signal generator configured to generate the image output signal based on the color coordinates adjusted by the color-coordinate adjustment processing and the lightness component adjusted by the lightness adjustment processing;
a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate; and an acquisition unit configured to acquire a saturation of each of pixels forming an image based on the image input signal, wherein as the saturation acquired by the acquisition unit becomes higher, the controller increases the color-coordinate adjustment contribution rate while decreasing the lightness component contribution rate.

5. A signal processing device configured to convert an image input signal into an image output signal and to output the image output signal to a display device, the signal processing device comprising:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing; and a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate, and wherein the controller controls the color-coordinate adjustment contribution rate and the lightness component contribution rate based on a distribution of values of pixels having the specific hue.

6. A signal processing device configured to convert an image input signal into an image output signal and to output the image output signal to a display device, the signal processing device comprising:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing; and a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate, and wherein the controller controls the color-coordinate adjustment contribution rate and the lightness component contribution rate based on a frequency component of a pixel having the specific hue.

7. A projection-type image display device comprising:

a signal processing device configured to convert an image input signal into an image output signal and to output the image output signal to a display device, the signal processing device including:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing;

a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate; and an acquisition unit configured to acquire a hue of each of pixels forming an image based on the image input signal, wherein as the hue acquired by the acquisition unit becomes closer to the specific hue, the controller increases the color-coordinate adjustment contribution rate while decreasing the lightness component contribution rate;

a display device configured to display an image based on a video output image outputted from the signal processing device; and a projector configured to project the image displayed by the display device.

8. A projection-type image display device comprising:

a signal processing device configured to convert an image input signal into an image output signal and to output the image output signal to a display device, the signal processing device including:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing;

a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate; and an acquisition unit configured to acquire a saturation of each of pixels forming an image based on the image input signal, wherein as the saturation acquired by the acquisition unit becomes higher, the controller increases the color-coordinate adjustment contribution rate while decreasing the lightness component contribution rate;

a display device configured to display an image based on a video output image outputted from the signal processing device; and a projector configured to project the image displayed by the display device.

9. A projection-type image display device comprising:

a signal processing device configured to convert an image input signal into an image output signal and to output the image output signal to a display device, the signal processing device including:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing;

a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate, and wherein the controller controls the color-coordinate adjustment contribution rate and the lightness component contribution rate based on a distribution of values of pixels having the specific hue;

a display device configured to display an image based on a video output image outputted from the signal processing device; and a projector configured to project the image displayed by the display device.

10. A projection-type image display device comprising:

a signal processing device configured to convert an image input signal into an image output signal and to output the image output signal to a display device, the signal processing device including:

a color-coordinate adjustment unit configured to perform color-coordinate adjustment processing of adjusting color coordinates of the image input signal, according to a color reproduction range of the display device;

a lightness adjustment unit configured to perform lightness adjustment processing of adjusting a lightness component of the image input signal;

an output signal generator configured to generate the image output signal based on the color coordinates adjusted by the color-coordinate adjustment processing and the lightness component adjusted by the lightness adjustment processing;

a controller configured to control a color-coordinate contribution rate and a lightness component contribution rate based on a saturation of the image input signal, the color-coordinate contribution rate being a rate of contribution given to the image output signal by the color-coordinate adjustment processing, the lightness component contribution rate being a rate of contribution given to the image output signal by the lightness adjustment processing, wherein when the saturation of the image input signal is higher than a predetermined threshold in a specific hue, the controller increases the color-coordinate adjustment contribution rate while decreasing the lightness component contribution rate, and wherein the controller controls the color-coordinate adjustment contribution rate and the lightness component contribution rate based on a frequency component of a pixel having the specific hue;

a display device configured to display an image based on a video output image outputted from the signal processing device; and a projector configured to project the image displayed by the display device.

* * * * *